(12) United States Patent
Nagapudi et al.

(10) Patent No.: US 8,750,370 B2
(45) Date of Patent: Jun. 10, 2014

(54) CONGESTION-ADAPTIVE COMPRESSION

(75) Inventors: Venkatesh Nagapudi, Milpitas, CA (US); Vikram Bichal, Karnataka (IN); Satish Prabhakar Sathe, San Ramon, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 837 days.

(21) Appl. No.: 12/554,491

(22) Filed: Sep. 4, 2009

(65) Prior Publication Data
US 2011/0058474 A1    Mar. 10, 2011

(51) Int. Cl.
*H04B 1/66* (2006.01)
*H04N 7/12* (2006.01)

(52) U.S. Cl.
USPC ............. 375/240.02; 375/240.03; 375/240.23

(58) Field of Classification Search
USPC .................................................. 375/240–241
See application file for complete search history.

(56) References Cited

U.S. PATENT DOCUMENTS

| | | | | |
|---|---|---|---|---|
| 5,003,307 A * | 3/1991 | Whiting et al. | ................. | 341/51 |
| 5,371,499 A * | 12/1994 | Graybill et al. | ................. | 341/51 |
| 5,406,279 A * | 4/1995 | Anderson et al. | ................ | 341/51 |
| 5,515,377 A * | 5/1996 | Horne et al. | ............. | 370/395.64 |
| 6,236,341 B1 * | 5/2001 | Dorward et al. | ................ | 341/60 |
| 6,535,485 B1 * | 3/2003 | Story | ............................ | 370/231 |
| 7,020,263 B2 * | 3/2006 | Bauer et al. | .................... | 379/219 |
| 7,069,342 B1 * | 6/2006 | Biederman | .................... | 709/247 |
| 7,098,815 B1 * | 8/2006 | Samuels et al. | ................. | 341/51 |
| 7,319,667 B1 * | 1/2008 | Biederman | ................... | 370/231 |
| 7,420,992 B1 * | 9/2008 | Fang et al. | ..................... | 370/477 |
| 7,646,790 B2 * | 1/2010 | Minami et al. | ................ | 370/469 |
| 7,830,797 B1 * | 11/2010 | Nachum et al. | ............. | 370/230.1 |
| 8,015,315 B2 * | 9/2011 | Chiang et al. | .................. | 709/238 |
| 2007/0096954 A1 * | 5/2007 | Boldt et al. | ..................... | 341/50 |
| 2008/0219357 A1 * | 9/2008 | Pao et al. | .................. | 375/240.26 |
| 2008/0250119 A1 * | 10/2008 | Kanai et al. | .................... | 709/219 |
| 2008/0320003 A1 * | 12/2008 | Heinson et al. | ................. | 707/10 |
| 2009/0006510 A1 * | 1/2009 | Laker et al. | ..................... | 708/203 |
| 2009/0022413 A1 * | 1/2009 | Singh | ............................ | 382/244 |
| 2009/0187673 A1 * | 7/2009 | Ramjee et al. | ................. | 709/247 |
| 2010/0054701 A1 * | 3/2010 | DeCegama | ..................... | 386/94 |
| 2010/0250770 A1 * | 9/2010 | Barreto et al. | ................. | 709/231 |
| 2010/0250797 A1 * | 9/2010 | Khosravi et al. | ................ | 710/48 |
| 2010/0329256 A1 * | 12/2010 | Akella et al. | .................. | 370/392 |
| 2011/0043387 A1 * | 2/2011 | Abali et al. | ...................... | 341/51 |
| 2011/0058474 A1 * | 3/2011 | Nagapudi et al. | ............. | 370/235 |

* cited by examiner

*Primary Examiner* — Benjamin H Elliott, IV
(74) *Attorney, Agent, or Firm* — Wong, Cabello, Lutsch, Rutherford & Brucculeri, L.L.P.

(57) ABSTRACT

A network device is adaptively configured to compress an output data stream, responsive to congestion in the network. The network device receives indications of network congestion from another network device. Upon receipt of a congestion indication, the network device can adapt the compression technique to attempt to achieve more or less compression, depending on whether the congestion indication indicates more or less congestion. By adapting the compression to the level of network congestion, end-to-end latency of the network can potentially be decreased.

36 Claims, 18 Drawing Sheets

THIS FIGURE INTENTIONALLY OMITTED

*FIG. 4*

CONGESTION-ADAPTIVE COMPRESSION

TECHNICAL FIELD

The present invention relates to the field of networking, and in particular to data compression techniques in a possibly congested network.

BACKGROUND ART

Compressing packet data can result in less congestion in a network, especially in oversubscribed situations. Congestion is reduced because a compressed packet takes less time on the wire and takes less buffer space to store. On a typical switch configuration of 24 slower speed links trunked onto an oversubscribed pair of higher speed ports, even a 20% compression can make the switch an entirely non-blocking switch. Compression can result in lower end-to-end latency in congested networks, but may increase latency in other situations, such as uncongested networks.

SUMMARY OF INVENTION

The described techniques allow a network device to compress an output data stream adaptively based on indications of network congestion. These indications can include simple pause notifications or more complex congestion notifications that indicate a quantized level of congestion, allowing finer control over the compression of data by the network device.

In embodiments where the indications are simple pause flow control messages, the compression can be enabled upon receipt of the pause message and disabled when the flow control mechanism allows data to begin to flow across the network.

In embodiments where quantized levels of compression are indicated in congestion messages, when the congestion level increases, the congestion technique can be adapted to increase compression. When the congestion level decreases, the congestion technique can be adapted to decrease compression, or even disable compression altogether. The adaptive compression technique can thus achieve a lower end-to-end latency across the network.

The compression technique according to one embodiment matches strings in a data stream against previously seen strings of data, and replaces matched strings with a code word that is shorter than the matched string. A hash table memory is used for the matching process, and in some embodiments, a history table buffer is also provided for determining the length of the matched string.

The compression engine can respond to an indication of a quantized level of congestion by adapting the compression engine to alter one or more of the size of the string being matched, the hash table memory, and the history buffer, as well as altering the number of repetitions of compression. In addition, the compression engine can selectively perform an entropy encoding of the compressed data, resulting in further compression. All of these adaptations can be performed responsive to a quantized level of congestion, in order to vary the compression ratio, increasing the compression when congestion increases and decreasing the compression when congestion decreases.

At the receiving network device, the decompression technique can generally decompress the compressed data stream at line speed, independent of the adaptations of the compression technique performed by the compression engine.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

(FIG. 4 is omitted.)

DESCRIPTION OF EMBODIMENTS

The following is described in terms of an network switch in an Ethernet network, but the present invention is not limited to Ethernet networks and can be embodied in any type of networking apparatus in which data is transmitted between a source and a destination across a network infrastructure, whether through wired or wireless communications techniques, and using any desired communications protocol that allows for the delivery of self-contained bundles of information, whether identified as packets, frames, or any other nomenclature.

Figure 1:
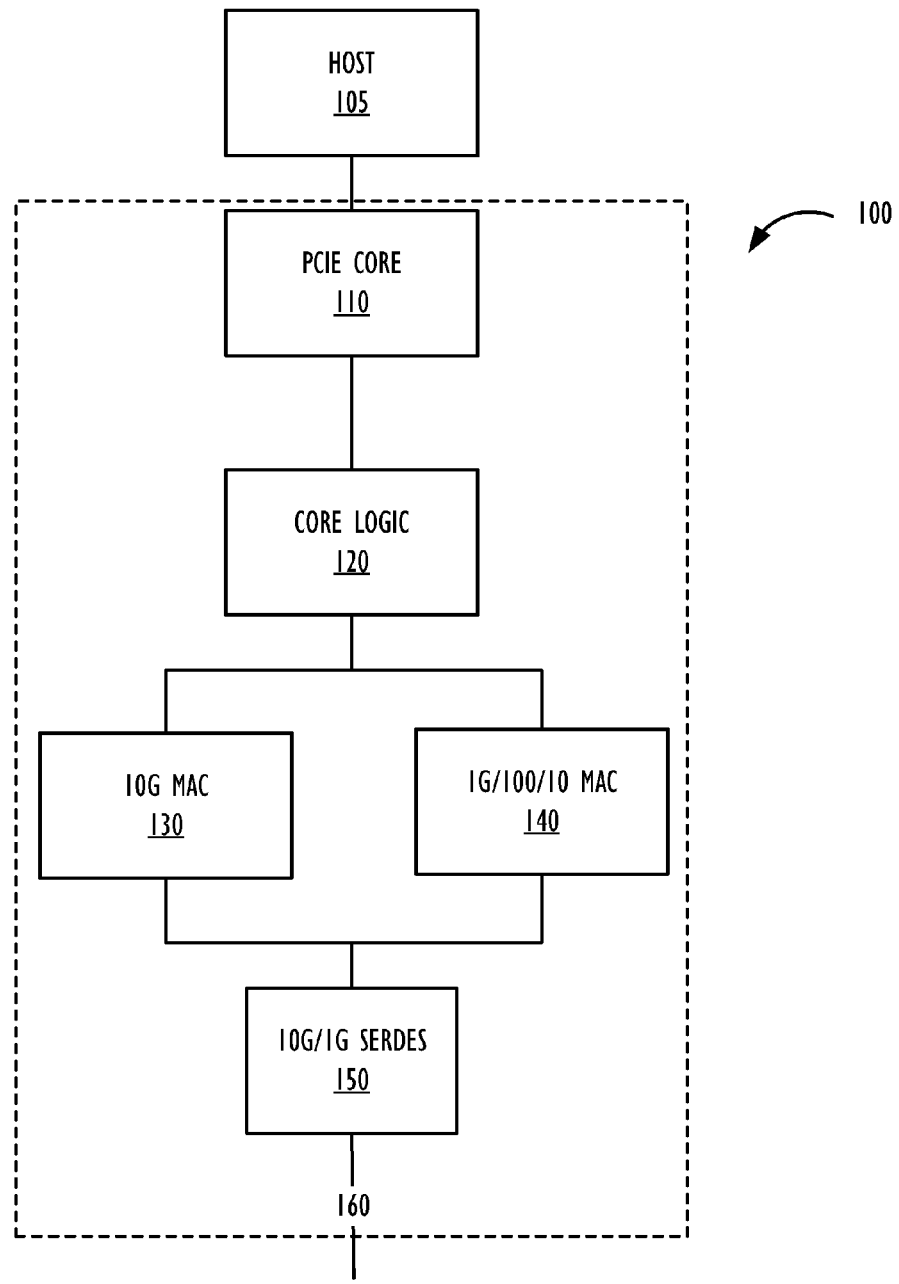
FIG. 1 is a high-level block diagram of a network switch according to one embodiment.

FIG. 1 is a high-level block diagram illustrating major blocks of one embodiment of a network switch 100. The network switch 100 can be a Fibre Channel over Ethernet switch or any other type of network switch. The network switch 100 is implemented as a PCIe card and contains a PCIe core 110 for handling the PCIe protocol interaction between the network switch 100 and a host 105 in a system in which the network switch 100 is installed. A Core Logic 120, typically implemented as an application specific integrated circuit (ASIC), handles the processing logic for the network switch 100. In the embodiment illustrated in FIG. 1, the network switch 100 is capable of connecting to an Ethernet link 160 that can range in speed from 10 Mbps to 10 Gbps. A 10 Gbps link 160 is handled by a 10 G Media Access Control (MAC) logic 130, while lower speeds are handled by a 1 G/100/10 MAC logic 140. Regardless of the speed of the link 160, serialization and deserialization of data across the link 160 is handled by a 10 G/1 G serializer/deserializer (SERDES) logic 150. In some embodiments, the network switch 100 can handle multiple Ethernet links, and multiple MAC and SERDES logics can be used for that purpose. The high-level structure illustrated in FIG. 1 is illustrative and by way of example only, and other high-level structures and collections of logic blocks can be used as desired.

The core logic 120 of the network switch 100 is capable of compressing and decompressing data streams that are transmitted or received through the network switch 100 across the link 160, using a compression/decompression technique that is suitable for on the fly compression/decompression of data packets being transmitted or received across the link 160.

The compression technique used by the core logic 120 buffers a packet until the compressed data is at least half as much as the entire packet length in order to insure no under runs when transmitting the packet. By delaying the packet for this amount, the compression algorithm guarantees that it has less than half of the uncompressed data left to process. If the core logic 120 can process data at wire speed, no under run can occur from this point onwards, even if the uncompressed data results in a single byte of compressed data. If the data is not compressible, then the compression delay is half the time taken to transmit the packet. For example, if it takes 1 µs to transmit a packet, then the delay for an uncompressible packet would be 500 ns. If the data is compressible, then the delay can be longer, with a worst-case delay of 1 µs, assuming the algorithm can operate at wire speed.

Figure 2:
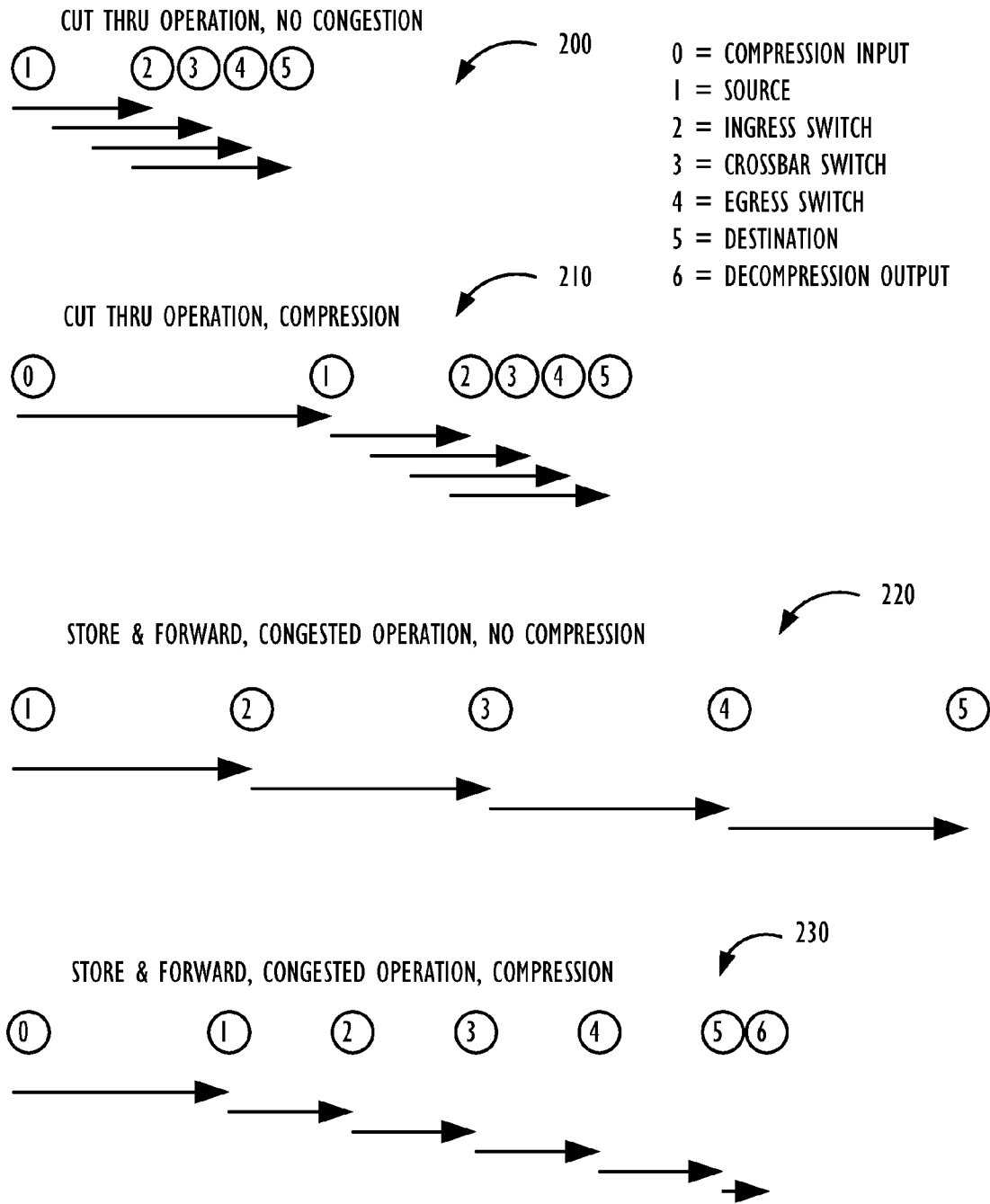
FIG. 2 is a diagram illustrating different effects of compression on end-to-end latency in a network.

FIG. 2 illustrates some scenarios where compression can either decrease or increase latency. If the network, for purposes of this example comprised of a source 1, an ingress switch 2, a cross bar switch 3, an egress switch 4, and a destination 5, is uncongested and the switches operate in a cut thru mode, as in scenario 200, then compression can result in an increased end-to-end latency, as illustrated in scenario 210. However, if the network is congested and the switches operate in store and forward mode, as in scenario 220, then the end-to-end latency can actually decrease because the compressed packet takes less time on the wire and hence gets to the destination faster, as illustrated in scenario 230.

In conventional network switches, compression is not related to network congestion. In one embodiment described below, the network switch 100 can determine that a network is uncongested and disable compression or that a network is congested and enable compression. In another embodiment described below, the network switch 100 can adjust compression techniques based on quantized network congestion information. The compression technique used is such that the receiving switch can decompress at wire speed, regardless of the amount of compression achieved by the transmitting switch.

Figure 3:
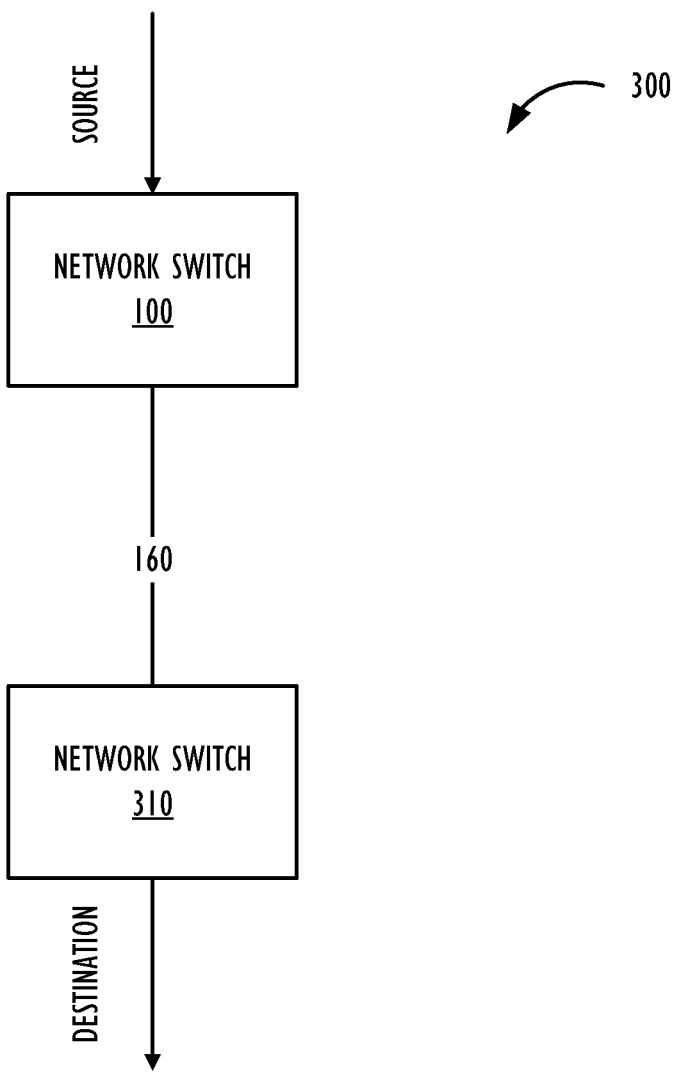
FIG. 3 is a block diagram illustrating a simple network according to one embodiment.

FIG. 3 illustrates a simple example network 300 with the network switch 100 of FIG. 1 connected to another network switch 310. For purposes of the discussion below, switch 100 is connected to the source of a stream of packets or frames of information, and switch 310 is connected to the destination of the stream. Although an actual network typically contains numerous other nodes, for clarity of this example, only the two network switches 100 and 310 are shown in FIG. 3. In addition, although illustrated as directly connected by link 160 for simplicity of the drawing, the network switches 100 and 310 can be network connected with intermediary nodes.

In one embodiment, network switches 100 and 310 communicate using a flow control technique, such as found in IEEE 802.1Qbb, "Priority-based Flow Control," which is incorporated by reference herein in its entirety for all purposes, which allows network switch 310 to signal network switch 100 to pause the transmission of data across the link 160 to network switch 310. The specific pause signaling technique employed is illustrative and by way of example only, and any convenient technique for one network switch to signal another network switch to pause transmission can be used. In this embodiment, the network switch 100 can enable or disable compression based on the receipt of pause signals. When a pause signal is received, the network switch 100 can enable compression so that when it is allowed to restart transmitting, it can transmit the compressed the data stream, at which time it can disable compression if desired.

In another embodiment, network switches 100 and 310 communicate using a technique for sending congestion notifications, such as found in IEEE 802.1Qau, "Quantized Congestion Notifications" (QCN), which is incorporated by reference herein in its entirety for all purposes. QCN allows a receiving network switch 310 to provide feedback in the form of a congestion message to a transmitting network switch 100 regarding congestion in the network 300. As with the transmission pausing flow control technique described above, the QCN technique allows the network switch 100 to attempt to reduce congestion by reducing the flow rate.

The QCN technique allows the receiving network switch 310 to indicate quantized network congestion levels in a message of a pre-defined format sent through the network 300 to the transmitting network switch 100. The transmitting network switch 100 typically responds by reducing (or increasing) the data flow rate based on the contents of the message. The format of the message used for the congestion notification is not significant for the purposes of this disclosure and is therefore not set out in detail herein.

The congestion level information is described herein as quantized, because a large range of congestion values is approximated by a relative small set of values. The concept of quantization is well known in the art and is not discussed further herein. The specific quantized values for the levels of congestion are not significant for purposes of this application are therefore not discussed herein.

The QCN congestion notification technique outlined above is illustrative and by way of example only, and any convenient technique for one network switch to signal another network switch regarding quantized levels of network congestion can be used.

When the network switch 100 receives a congestion notification from the network switch 310, indicating congestion on link 160 has occurred or has increased, the network switch 100 responds by decreasing the data flow rate across the network. The network switch 100 can also adapt the compression technique responsive to the congestion notification, to attempt to decrease end-to-end latency. By requesting higher compression of the data stream, so that the same uncompressed input can traverse the network in less time.

Similarly, when the network switch 100 receives a congestion notification from the network switch 310, indicating that the congestion on link 160 has cleared or decreased, then the network switch 100 can respond by increasing the data flow rate across the network. In that situation, the network switch 100 can also adapt the compression technique used on the link 160 responsive to the congestion notification, to attempt to decrease end-to-end latency by requesting less compression or even suspending compression of the data stream.

How the network switch 100 adapts the compression technique can depend on the compression technique used. Some compression techniques, e.g., the JPEG technique commonly used on still images, are considered lossy compression techniques, i.e., some of the original data is lost when compressed and cannot be recreated when the compressed data stream is decompressed. Because the compression technique is used in a data communication application, the compression technique chosen is preferably a lossless data compression technique; i.e., a compression technique that allows for decompression of the original uncompressed content without the loss of any of the source data.

In one embodiment, described in more detail below, the network switch 100 employs a form of Liv-Zempel compression, such as a Liv-Zempel-Oberhumer (LZO) compression technique, that is designed to allow fast compression and decompression that can be performed entirely in hardware in a compression engine of the core logic 120, trading compression ratio (the difference in the size of the compressed data stream and the size of the uncompressed data stream) for speed of compression and decompression. There are numerous LZO compression techniques. In one embodiment, the network switches 100 and 310 implement a McLZO compression and decompression technique. The use of McLZO compression and decompression techniques is illustrative and by way of example only, and any convenient compression technique that provides for lossless compression and decompression at wire speeds can be used. Preferably, the compression technique is implemented in hardware, to maximize the compression and decompression speed.

Before discussing how the disclosed embodiments adapt the compression based on congestion, a brief overview of how McLZO compression and decompression works may be useful.

McLZO is a block compression algorithm, i.e., it compresses and decompresses a block of data at a time, rather than one byte at a time. The block size must be the same for compression and decompression. McLZO compresses a block of data into matches, using a sliding dictionary, and runs of non-matching literals. The technique produces a good compression ratio (the ratio between the uncompressed and compressed data) on highly redundant data and deals acceptably with non-compressible data, only expanding uncompressible data by a maximum of 1/64th of the original size when measured over a block size of at least 1 kB.

The McLZO concept is to find repeating strings in a data stream, replacing later occurrences of the string with a distance and length vector that points to the previous occurrence of the string in the original input data. Because the distance and length vector are smaller than the string that it replaces, the string is compressed by the difference between the size of the original string and the size of the distance and length vector. If the distance field is at least one byte long and the length field is at least one byte long, then the smallest string that can be compressed is 3 bytes long, as the result is a two-byte {distance, length} code. For example, consider the following data streams (where the first byte transmitted is at the left):

Example 1 a b c d e f g x y z a b c l m n
could be replaced with:
a b c d e f g x y z {10,3} l m n
where {10,3} indicates that the same 3 byte pattern occurred 10 bytes earlier in the data stream.

Example 2 a b c d a b c d a b c d
could be replaced with:
a b c d {4,8}
In this example, the length field is longer than the distance field, indicating that the pattern repeats from the start after every four bytes.

Example 3 a a a a a a a a a a a a
could be replaced with: a {1,11}

Example 4 a b a b a b a b a b c d
could be replaced by
a b {2,8} c d
In certain situations, a pattern may have occurred multiple times, and may have repeated in variable lengths. For example,
a b c d e f g h i d e f g h a b c d e f g h i
could be replaced by
a b c d e f g h i {6,5} {14,3} {8,5}i
or
a b c d e f g h i {6,5} {14,9}
Both solutions are correct but the second one results in better compression.

The distance and length vector typically comprises a match code word. The decompression technique finds the match codes, reads the location that is pointed to by the distance field, and then reads the number of bytes indicated by the length field. The decompression logic needs a way of identifying whether a particular byte is part of a literal (uncompressed) data, or is part of a match code word. In addition, code words can be inserted into the byte pattern to help the decompression logic determine the string boundaries. Preferably, the decompression technique checks for data corruption to verify that the data after compression and decompression actually matches the original data by including an error checking code, such as a cyclic redundancy check (CRC), in the data stream. For example,
a b c d e f g h i d e f g h a b c d e f g h i
could be replaced by
{l9} a b c d e f g h i {m6,5} {m14,3} {m8,5} {l1} i
where {l9} indicates that there are 9 literal bytes following the literal code word, and {m6,5} indicates a match code word with distance 6 and length 5.

The format for the various code words described below is illustrative and by way of example only, and any desired format for the code words can be used.

Figure 5:
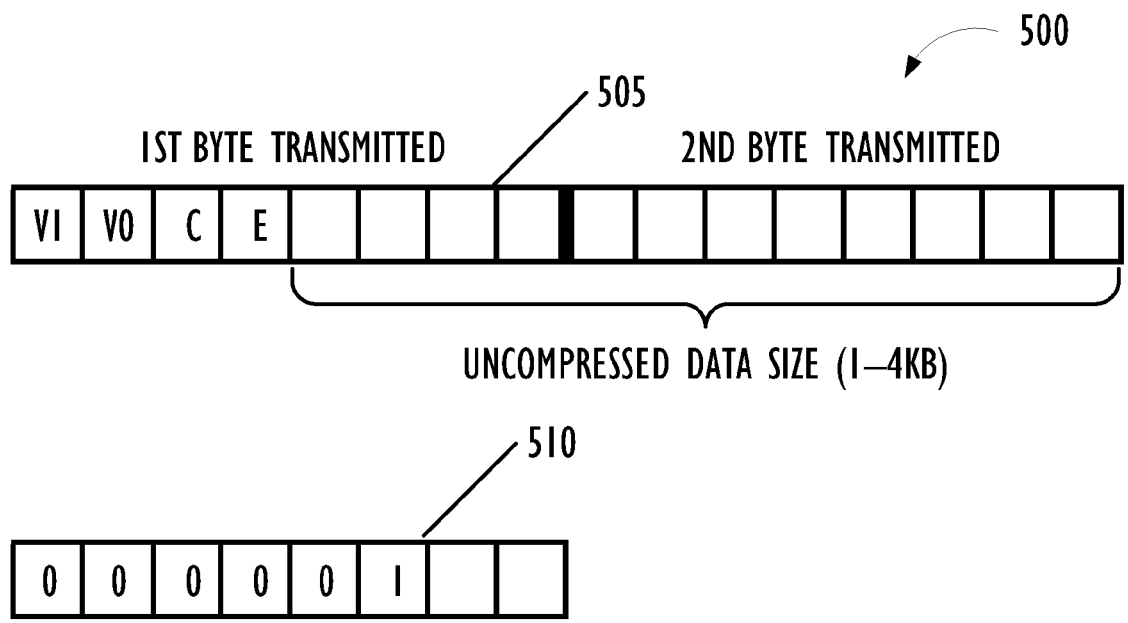
FIG. 5 is an illustration of a start of segment code word and an end of segment code word according to one embodiment.
Figure 6:
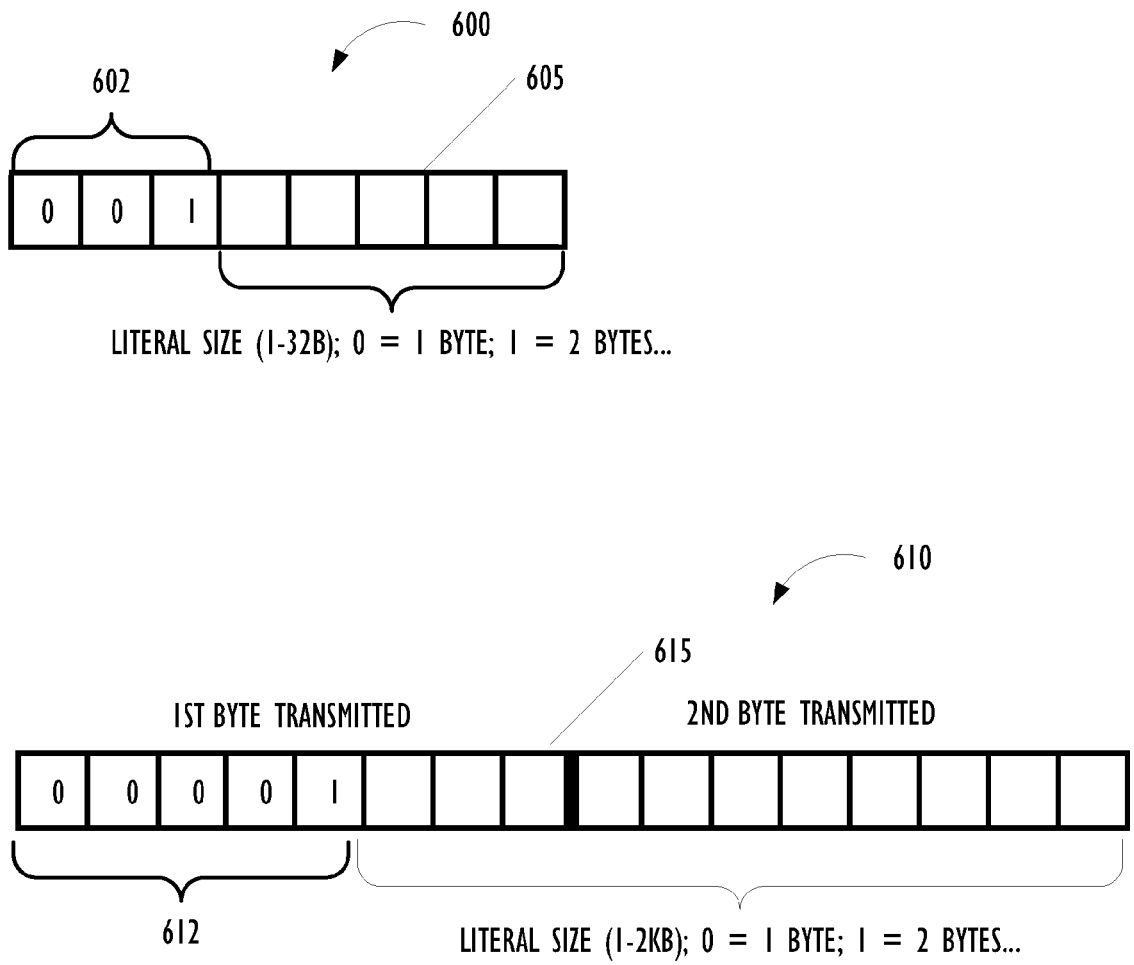
FIG. 6 is an illustration of two formats of a literal control word according to one embodiment.
Figure 7:
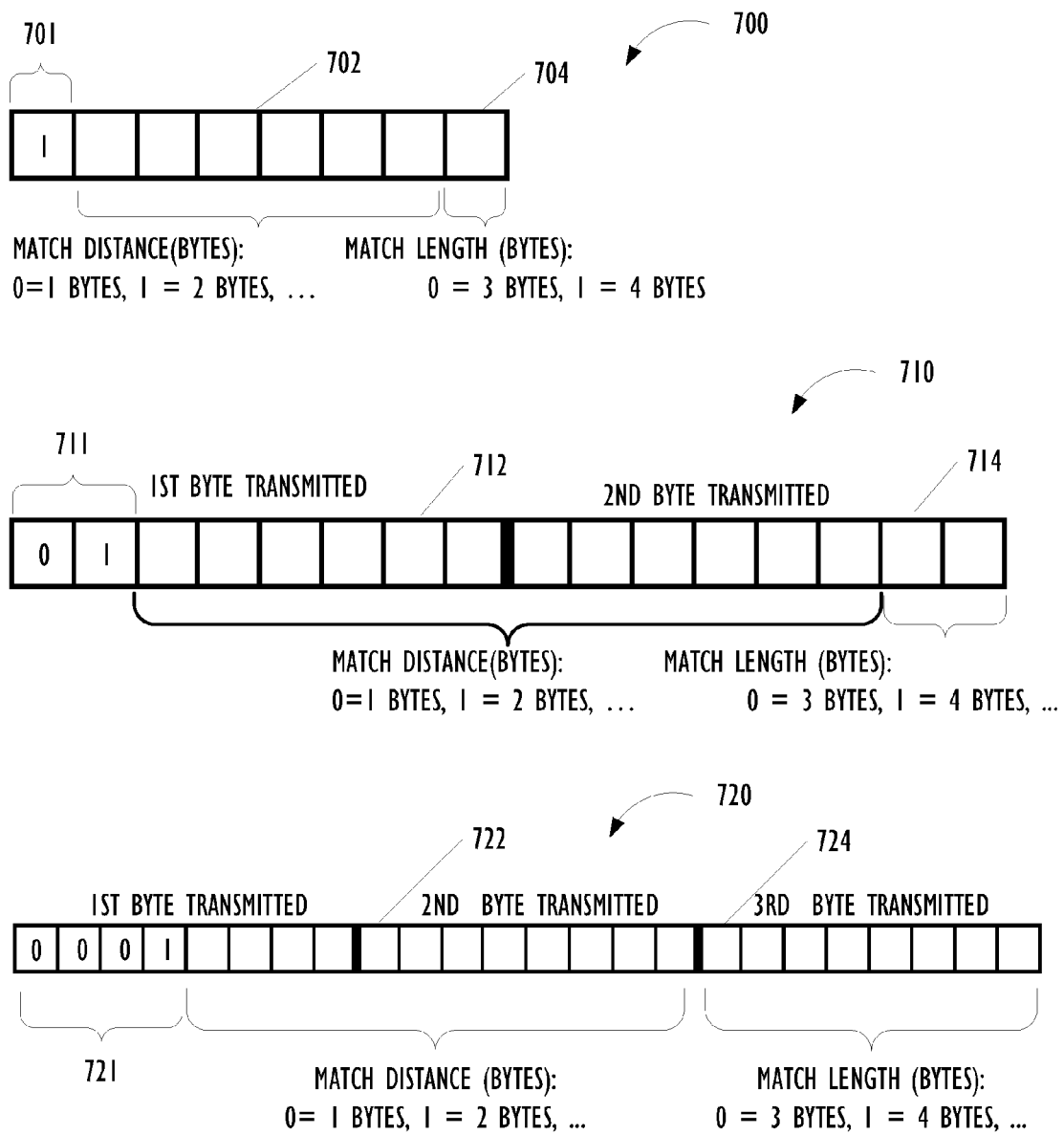
FIG. 7 is an illustration of three formats of a match code word according to one embodiment.

In one embodiment, illustrated in FIGS. 5-7, a prefix value in the code word indicates the type of code word that follows. In FIG. 5, a start of segment code word 500 is a two-byte string that indicates the start of a data segment. The first field of all packets or segments of a packet in a data stream according to this embodiment start with this code. A data stream can be a frame or any set of bytes which are to be compressed as a unit. The V bits indicate a version number of the compressor, to allow the decompressor to handle differences in the compression based on the compressor version. The C bit indicates whether the data transmitted in the current segment contains a CRC on the uncompressed data at the end. The E field indicates whether this segment is the last segment for the stream sent to the compressor. It is useful when the size of the data stream sent to the compressor is larger than what can be enumerated in the Uncompressed Data Size field 505. The Uncompressed Data Size 505 is the size of the segment before compression and allows determining how much buffering the uncompressed data will take before the decompression is done.

An End of Segment code word 510 is used to mark the end of a data segment can also signal the end of the packet or EOP.

Turning to FIG. 6, two forms of a Literal code word are illustrated. Literal code word 600 allows indicating that a string of length 1-32 bytes follows, and Literal code word 610 allows indicating that a string of length 1-2KB follows. In either code word, the length field 605 or 615 is expressed as the actual length minus one, because a zero length literal field is not allowed. A prefix 602 or 612 allows distinguishing between the two forms of a literal code word.

FIG. 7 illustrates three forms of a Match code word. In form 700, a single Match code byte includes the distance field 702 and length field 704, where the distance field 702 can point backwards in the data stream by up to 64 bytes, and the length field 702 can indicate a length of 3 or 4 bytes. In two-byte form 710, a longer distance field 712 allows for specifying a matching string up to 4096 bytes away in the data stream, but only allows for a 3-6 byte matching string. Three-byte form 720 also allows for a distance field 722 indicating the matching string is up to 4096 bytes away and a length field 724 allowing a matching length of between 3 and 258 bytes. All three forms of the match code word can be distinguished by unique prefix bits 701, 711, and 721.

In addition to the McLZO compression described above, an entropy encoding, such as Huffman encoding, can be used to increase the compression ratio of the data stream. An entropy encoding technique tries to exploit the fact that certain encodings of a byte occur more often than others. For example, in an ASCII file the encodings that correspond to certain characters occur more often. Commonly occurring bytes can be represented by fewer than 8 bits, and less frequently occurring bytes can be represented by more bits than the commonly occurring bytes. However, since the commonly occurring bytes occur more often, the overall result is a compressed data stream.

Huffman encoding can use a preloaded library or a calculated library of most commonly occurring encodings. The library indicates which encodings happen more often than others and assigns the smallest number of bit representation to the most commonly occurring encoding. In one embodiment, a predetermined library is used. In another embodiment, a calculated library technique analyzes the current data to find which encodings happen most often, and then transmits the calculated library along with the data so that the destination can use it. Both the source and destination must have the same library in order to correctly encode and decode the data, and in a calculated library embodiment, the calculated library is typically transmitted at the beginning of the encoded data.

In one embodiment, the network switch 100 can transmit the data stream across the link 160 uncompressed, compressed by the McLZO technique, and compressed by both the McLZO technique and Huffman encoding, depending on the congestion of the network. If the network is uncongested, then the network switch can transmit the data stream uncompressed. If the network switch 100 receives a flow control indication of network congestion, then the network switch can transmit the data compressed. If multiple quantized levels of network congestion are distinguishable, the network switch 100 can use McLZO compression at lower congestion levels, and at higher congestion levels, the network switch can also include Huffman encoding, in addition to the McLZO compression, all to vary the resulting compression ratio responsive to the quantized level of network congestion. The Huffman encoding can potentially compress the bytes that contain the code words described above, in addition to the literal strings that remain in the data stream after the McLZO compression. In another embodiment, the network switch 100 can further change vary the compression ratio responsive to the quantized congestion level information by changing aspects of the compression technique, such as the way in which the length of the matching string is determined, as described below. Thus, compression of the data stream by the network switch 100 varies generally proportionally with the level of congestion of the network.

Figure 8:
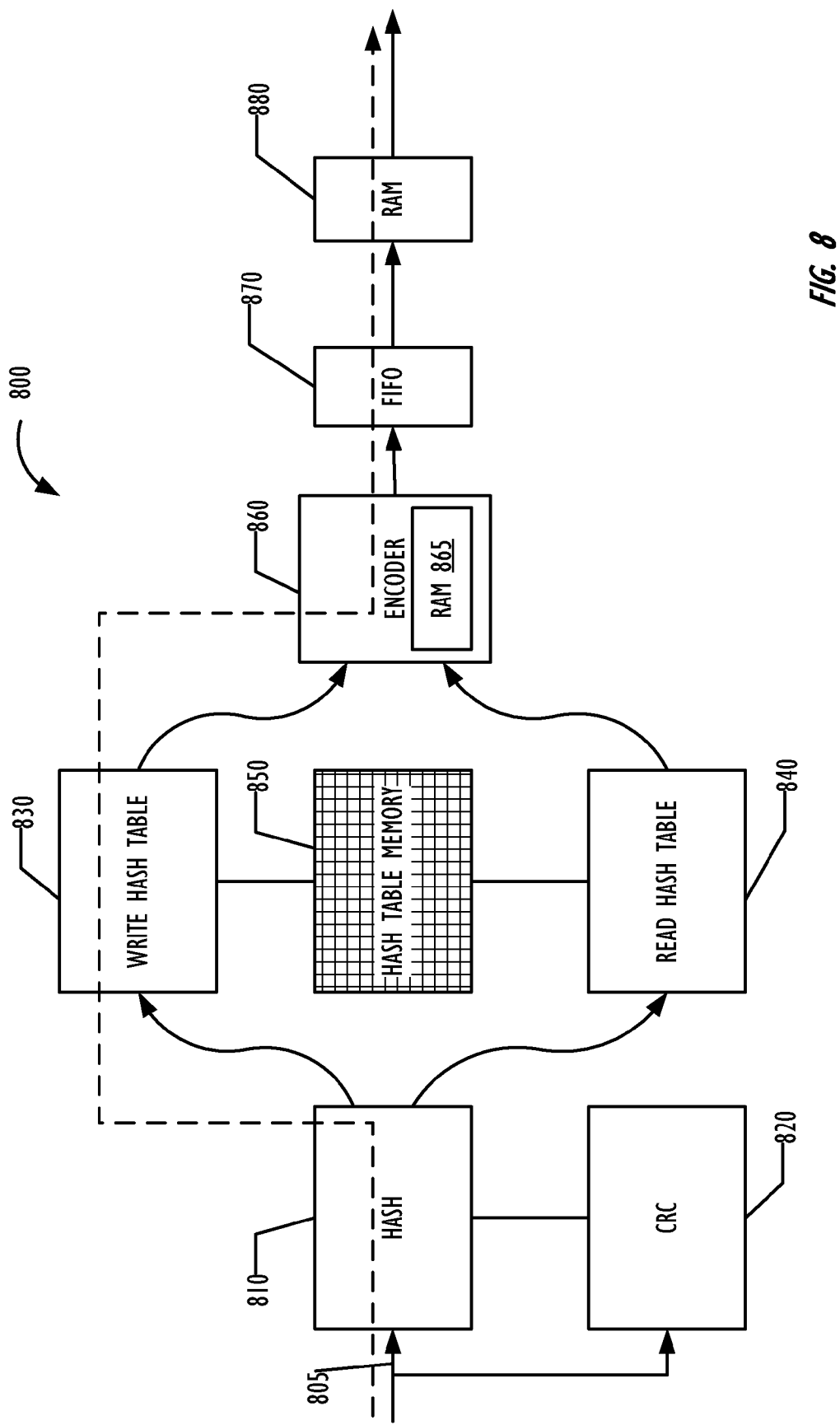
FIG. 8 is a block diagram illustrating logic blocks of a compression engine according to one embodiment.

Turning now to FIG. 8, a block diagram illustrates one embodiment of a compression engine logic 800 contained in the core logic 120 for compressing a transmitted data stream 805. The compression engine 800 is part of the core logic 120 of FIG. 1. The data stream 805 is received by a hash logic 810 and a cyclic redundancy check (CRC) logic 820, which adds data to the end of the data segment for error detection, before passing the additional data to the hash logic 810. The hash logic 810 then performs a hash function on the data stream in three bytes chunks, as described below, on portions of the data stream 805. The hash logic 810 then passes the hash values to both a write hash table logic 830, which adds those values to a hash table memory 850, and to a read hash table logic 840, which attempts to match three-byte strings to previously identified three-byte strings. The data stream then passes to the encoder logic 860, which inserts match code words 700, 710, or 720 and literal code words 600 or 610 as appropriate, before putting the compressed data stream in a FIFO buffer 870. Compressed data is then pulled from the FIFO buffer 870 into RAM 880 for transmission over the link 160. As indicated by the dashed line in FIG. 8, when no compression is to be performed, for example when the network is uncongested, then the Read Hash Table logic 840 is bypassed, but the hashing and writing to the hash table functions are still performed. The hash logic 810, the read hash table logic 840, the write hash table logic 830, and the hash table memory comprise a matching logic for the compression engine 800.

Figure 9:
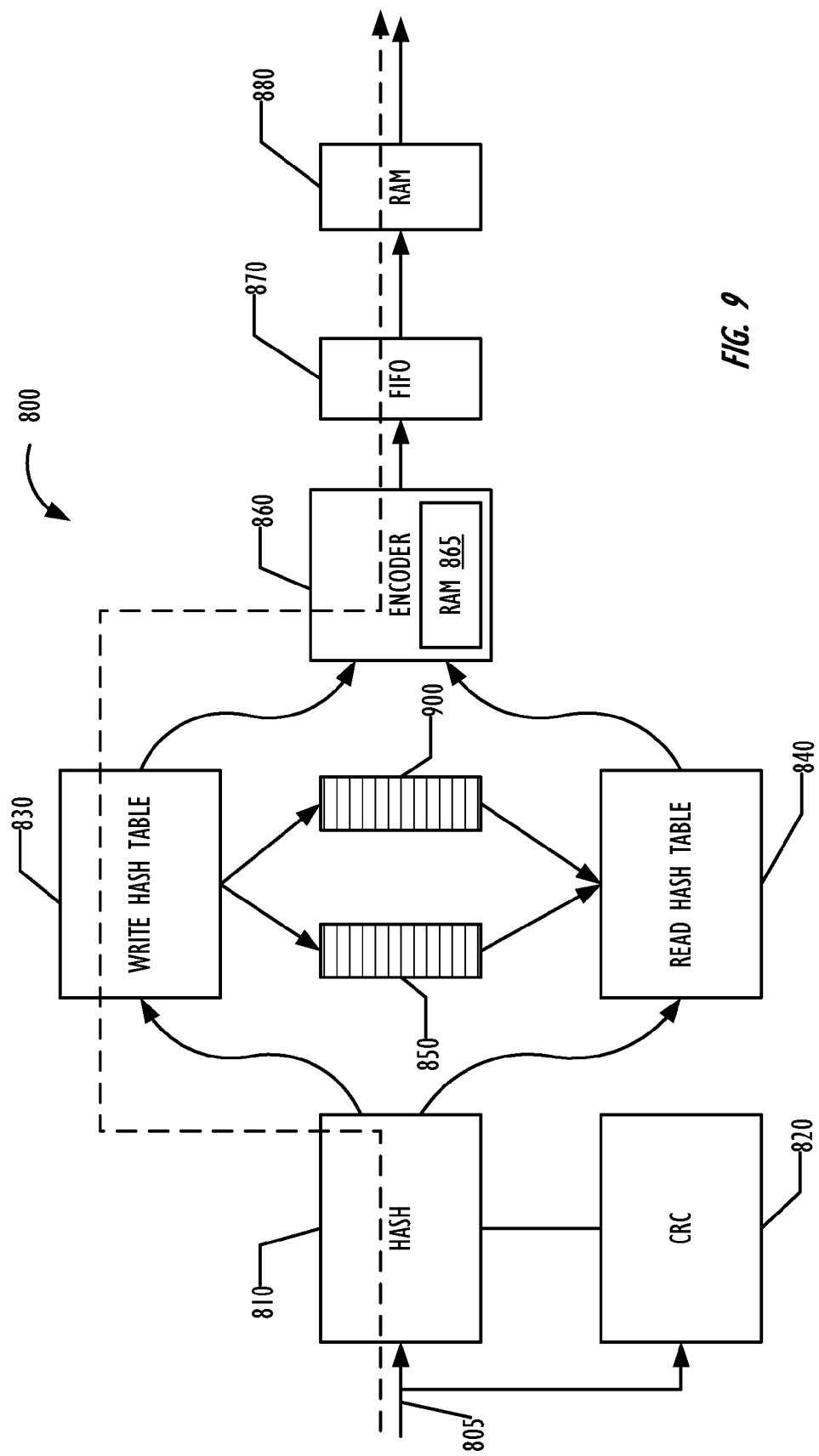
FIG. 9 is a block diagram illustrating logic blocks of a compression engine according to another embodiment.

In another embodiment, the compression engine 800 illustrated in FIG. 9 additionally uses a history buffer FIFO 900 as part of the matching logic in the compression of the data. The history buffer 900 allows potentially better compression of the data stream 805, as described below.

Consider the following data stream:
{ABCDEFGHIJKLEFGPQABCDEFGHIJXYZ}
The compression achieved in the embodiment of FIG. 8, without the history buffer 900, is
{A B C D E F G H I J K L [8,3] P Q [17,4] [9,3] [17,3] XYZ}
The compression achieved in the embodiment of FIG. 9, with history buffer 900, is
{A B C D E F G H I J K L [8,3] P Q [17,10] XYZ}
The three match code words of the FIG. 8 embodiment ([17,4], [9,3], [17,3]) are combined in the FIG. 9 embodiment into a single match code word [17,10]. In one embodiment, where all of the match code words in the FIG. 8 embodiment are 2-byte match code words as discussed above regarding FIG. 7, even if the match code word of the FIG. 9 embodiment is a 3-byte match code word, the resulting compressed string is shorter by three bytes.

Thus, in one embodiment, the network switch 100 can adapt the compression technique by enabling or disabling the use of the history buffer 900 to vary the compression ratio responsive to a quantized level of network congestion. If the history buffer 900 is enabled, in a further embodiment, the compression technique can adaptively select all or a portion of the history buffer as available for use. By using less than the entire history buffer, the compression technique lessens the potential for a match, because less of the input data is available for matching. Therefore, at a first congestion level, a first portion of the available history buffer 900 can be used, and at a second congestion level, a second portion of the available history buffer 900 can be used. If the first portion is smaller than the second portion, then less compression is potentially achievable. In such an embodiment, the higher the congestion level, the greater the portion of the available history buffer that is used, to increase the potential for compression of the data stream.

A further embodiment of the encoding logic 860 can increase the compression at even higher congestion levels by enabling an entropy encoding, such as Huffman encoding, to compress the data stream further, including the literal and match code words inserted by the encoder logic 860.

If the compression encoding described above is repeated, the compression ratio is also increased in a typical data stream. In one embodiment the compression engine 800 can perform multiple iterations of the compression encoding described above responsive to the quantized level of network congestion, thus further varying the compression ratio responsive to that quantized level of network congestion.

Figure 10:
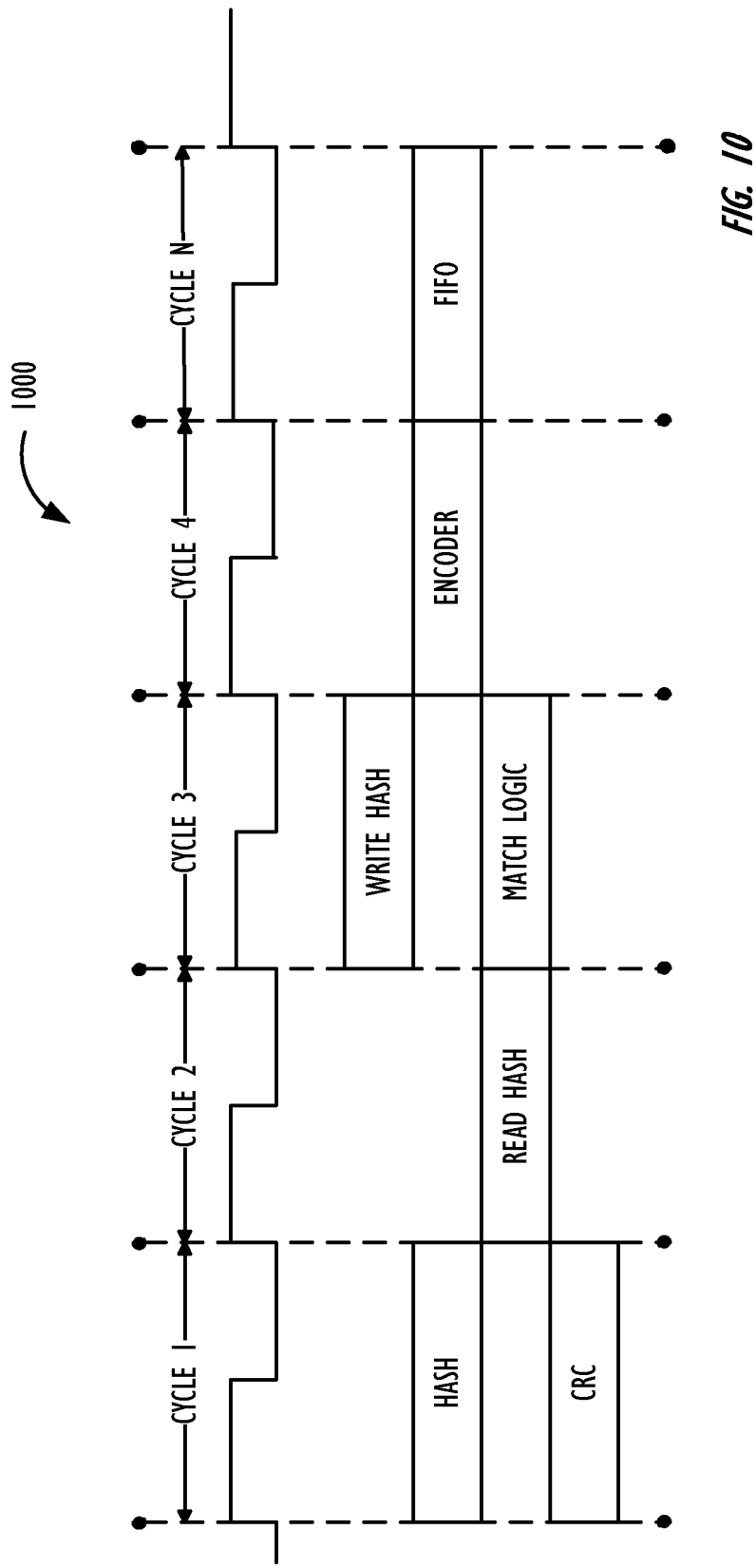
FIG. 10 is a timing chart illustrating relative timing of compression events according to the embodiments of FIGS. 8 and 9.

FIG. 10 is a timing chart illustrating how one embodiment of the compression technique overlaps processing to improve latency of the compression. In Cycle 1, the data stream is hashed by the hash logic 810 and a CRC is calculated by the CRC logic 820. Then in cycle 2, the Read Hash logic 840 reads the hashes computed from the hash table and determines whether any matches are found in Cycle 3. Also in Cycle 3, the Write Hash logic 830 writes the hash values calculated in Cycle 1 to the hash table 850, and in the embodiment with the history FIFO buffer 900, writes the corresponding uncompressed data to the history buffer 900. Then in Cycle 4, the Encoder logic generates the necessary code words and inserts them into the transmission FIFO 870. Finally, in Cycle n, when the FIFO 870 has accumulated 8 bytes of output data, it drives the output data into RAM 880 for transmission on link 160.

We now turn to the hashing technique in more detail. In one embodiment, at the beginning of a data stream, a location pointer into the history buffer is initialized to 0, and then incremented per byte of successive data in the data stream 805. For the current byte being processed, a hash over that byte and the next 2 bytes is calculated. Alternately, the hash value can be calculated over the current byte and the two previous bytes in the data stream 805. The hash is used as an address to the hash table memory 850, and the location pointer along with a valid bit is written as a hash table entry. For every subsequent byte, the hash location in the hash table memory 850 is read to determine whether that hash was seen before in the same data stream. If it was, then the location pointer into the history buffer 900 is used as the address into the history buffer 900 to read the contents at that location. If the data stored at that location matches the current pattern, then the difference between the current location pointer and the stored location pointer is calculated as the distance vector. Since the hash is calculated over 3 bytes of data, the initial length will be 3. The hash is calculated over 3 bytes because the distance and length vectors typically take 2 bytes to represent, so any repeating pattern of length 2 bytes typically does not result in any compression.

Once a match is found in the history buffer 900, the subsequent locations of the history buffer 900 are read to see if the match extends beyond 3 bytes. If it does, then the length vector is incremented. If it does not, then the hash is calculated and checked again as before.

EXAMPLES

Example 1 a b c d e f g x y z a b c l m n

The contents of the history buffer and hash table after 10 bytes is:

history buffer: a b c d e f g x y z hash table:
H{abc}=v,0
H{bcd}=v,1
H{cde}=v,2
H{def}=v,3
H{efg}=v,4
H{fgx}=v,5
H{gxy}=v,6
H{xyz}=v,7
H{yza}=v,8
H{zab}=v,9 where v is a valid bit and is set to indicate a valid hash location. In the next cycle, the hash H{abc} is calculated and then that location is read.

The data at location (v,0) indicates that the same hash occurred before at location pointer 0. Therefore, the history buffer location 0 is read. Since the first byte matches (a), the next two locations are read, finding (b,c) which also match. Meanwhile, the hash table is updated with the new entries. Now, when byte 1 occurs in the data stream, the hash H{bcl} location indicates not valid, therefore the match is only a 3 byte match, and the distance is Current byte position−0=Current byte position. In another embodiment, such as the embodiment of FIG. 8, where no history buffer is available, instead of a pointer to the history buffer, the hash table entry can contain a copy of at least a portion of the data used to calculate the hash value, which is used for matching the incoming data string.

Figure 11:
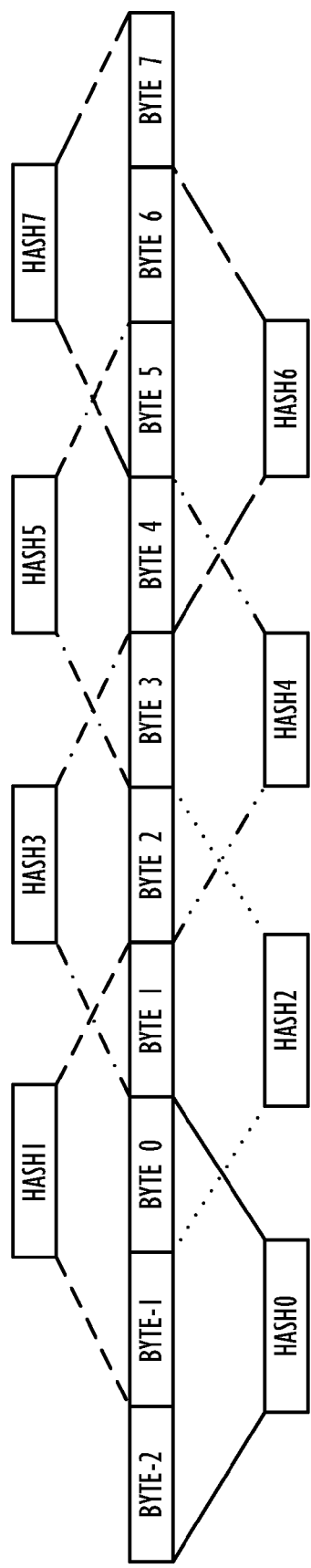
FIG. 11 is a block diagram illustrating a technique for hashing uncompressed data according to one embodiment.

Considering the logic blocks of FIGS. 8 and 9 in more detail, the hash logic 810 in one embodiment takes a window of 8-byte chunks of input data and computes a 10-bit hash value for each 3 bytes of input data, resulting in 8 hash codes in a single clock cycle. As illustrated in FIG. 11, the hash logic 810 in one embodiment computes a hash value based on the current byte and the previous two bytes. Thus for example, if the data received in Clock 0 is {x, y, z, -, -, -, -, -} (where the "-" indicates bytes of no interest, and the data received in Clock 1 is {h, g, f, h, d, c, b, a}, then, the 8 hashes computed in clock 1 are as follows:

hash0=Fn(a, x, y}
hash1=Fn(b, a, x}
hash2=Fn(c, b, a}
hash3=Fn(d, c, b}
hash4=Fn(e, d, c}
hash5=Fn(f, e, d}
hash6=Fn(g, f, e}
hash7=Fn(h, g, f}

The hashes computed are passed to the Read Hash Table logic 830 and the Write Hash Table logic 820 along with a valid indication. At the end of the packet (EOP), a CRC is appended by the CRC logic 820 and a hash is computed on the CRC as if it were part of the original input data stream 805.

If the data EOP does not align with a 64-bit boundary, the CRC appending is done slightly differently. For example, if the data received in the last clock before the EOP is {-, -, -, -, w, x, y, z}, then the CRC is computed in the same clock from the previous 8 bytes {a, b, c, d, e, f, g, h}. Then the data for hash computation in the last 2 clocks from the Hash logic 810 would be:

{a, b, c, d, w, x, y, z}
{a, b, c, d, e, f, g, h}

The hash valid bits will be sent accordingly to Read Hash Table logic 840 and Write Hash Table logic 830. Once the EOP is received and after the CRC hash is sent, the Hash logic 810 will generate a reset pulse to reset the valid bits in the hash tables 850. The EOP given out from the hash logic 810 will thus include the CRC/Parity bytes.

The hash logic 810 informs the Read Hash Table logic 840 about the last data and bytes valid.

In one embodiment, the history buffer 900 is a 64-bit wide 512-entry buffer. Each hash table comprises eight 27-bit wide entries, and the hash table memory 850 can store 1024 hash tables. The hash logic 810 maintains a 12-bit counter to count 4 KB blocks and to compute the History Buffer Address and reset the Hash Table memory 850 at 4 KB boundaries.

In an embodiment in which no history buffer 900 is available or in which the history buffer has been disabled responsive to quantized level of network congestion, the Hash logic 810 behaves the same as in embodiments in which the history buffer 900 is available and enabled. In that embodiment, the Hash Write logic 830 writes an index into the hash table entries that simulates an offset into the history buffer. When determining the length of the matched string, the read hash logic 840 uses the index values themselves to determine the matched length. As each new byte is processed, if the value in the hash table entry is either invalid (indicating a match has never been seen) or is not incremented by 1 from the previous hash table entry, then the match terminates. Thus, in an embodiment such as is illustrated in FIG. 8, with no history buffer, the previous example uncompressed data stream:

{ABCDEFGHIJKLEFGPQABCDEFGHIJXYZ} matches the second occurrence of the string "EFG," replacing it with {8,3}, but because the hash table entries for "EFG" are overwritten to point to the most recent occurrence of that string, the hash table value for "EFG" is not incremented sequentially from the hash table entry for "DEF," and will limit the match to "ABCD," resulting in the compression

{A B C D E F G H I J K L [8,3] P Q [17,4] [9,3] [17,3] XYZ} as described above. Thus, the embodiment of FIG. 9 can achieve a higher compression ratio than the embodiment of FIG. 8.

Figure 14:
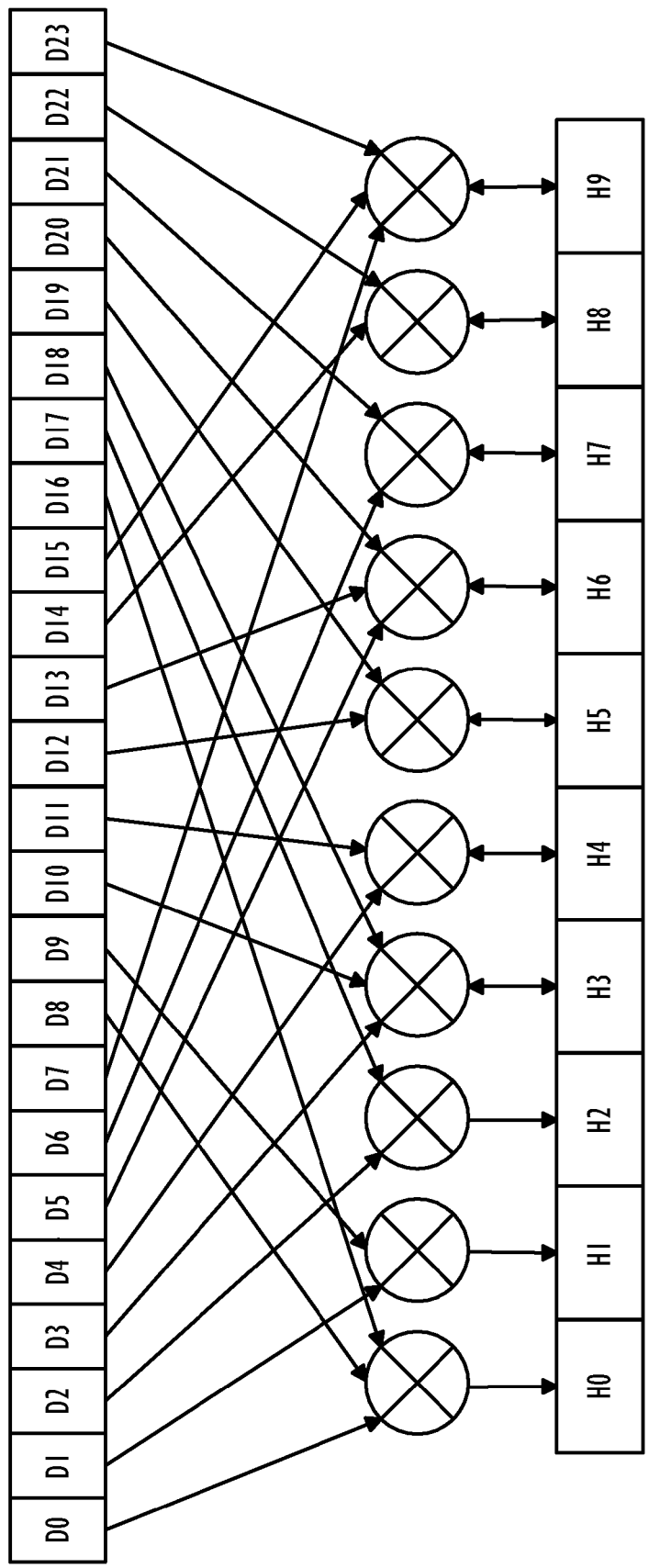
FIG. 14 is a block diagram illustrating a hashing function according to one embodiment.

In one embodiment, the hash function is illustrated in FIG. 14 and XORs the 24 bits of the input data to produce a 10-bit hash value as follows:

H0=D0^D8^D16
H1=D1^D9
H2=D2^D17
H3=D3^D10^D18
H4=D4^D11
H5=D12^D19
H6=D5^D13^D20
H7=D6^D21
H8=D14^D22
H9=D7^D15^D23

The 10-bit result is then used as an index into the hash tables 850.

The CRC logic 820 in one embodiment calculates parity of all the incoming bits and gives the result to HASH logic 810 in the next clock cycle, as follows:

crc_new=crc_old^data_in

In another embodiment, the CRC block 820 generates the 4-byte CRC used for Ethernet MAC packets.

Figure 13:
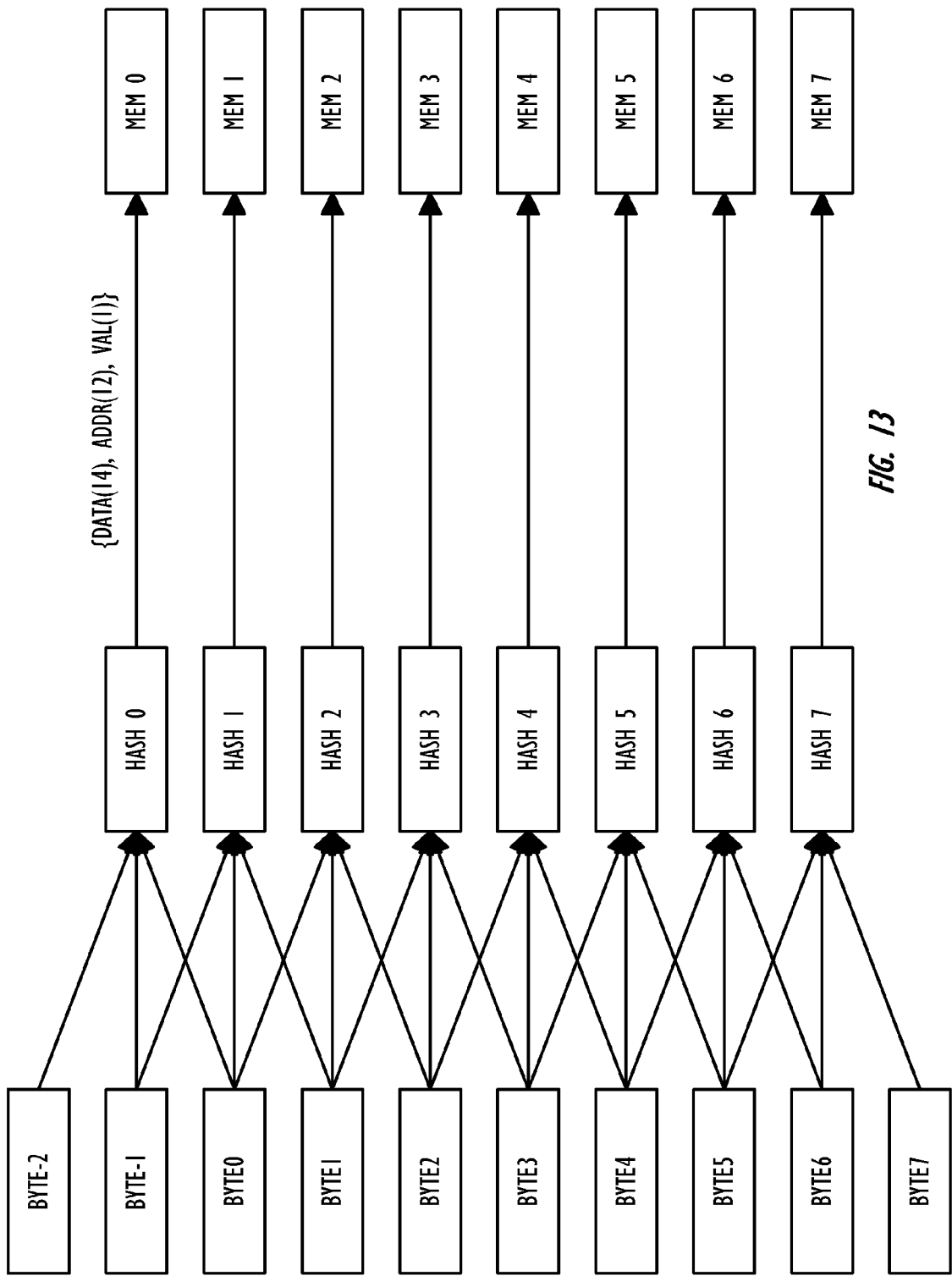
FIG. 13 is a block diagram illustrating a technique for creating hash table entries according to one embodiment.

The write hash logic 830 according to one embodiment registers the data, hash, and valid bits to adjust the latency as shown in FIG. 13.

Each of the 8 hash values are used to create a hash table entry. In one embodiment, only 14 bits of the 24 data bits used for hashing are extracted to be written into the respective hash table of the hash table memory 850 indicated by the 10-bit value calculated by the hash logic 810. The write hash logic then concatenates the 14 data bits, the 12-bit address into the history buffer 900 of the current three input data bytes, and a 1-bit valid field, writing the 27-bit entry into Hash Table memory 850, for each of the 8 hash values calculated by the hash logic 810. The write hash logic 820 then passes the 8 input data bytes to Encoder logic for further processing.

At EOP the write hash logic 820 writes less than 8 hash table entries, only writing into some hash tables based on the data bytes valid signal.

Figure 12:
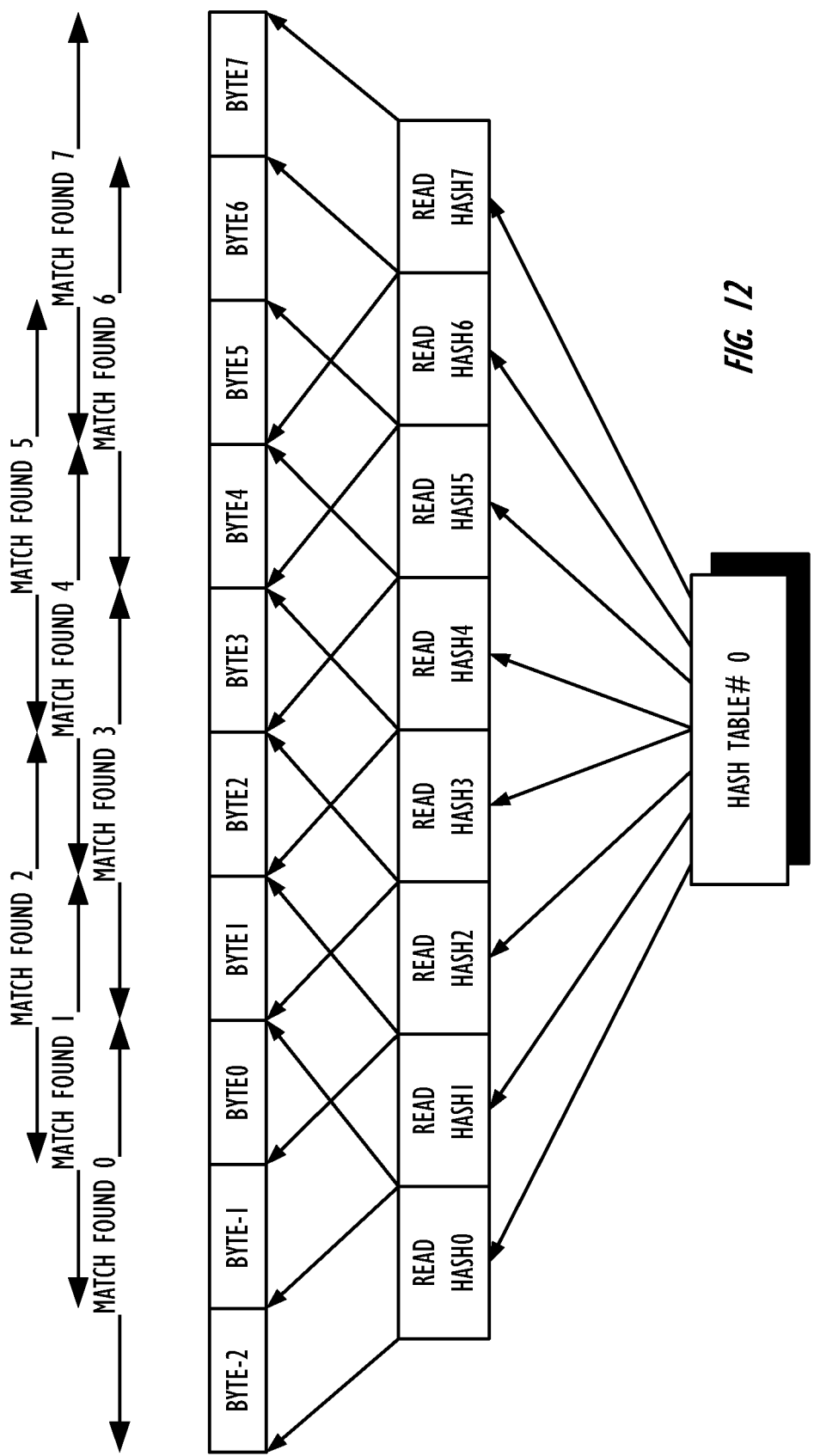
FIG. 12 is a block diagram illustrating matching hash values according to one embodiment.

The read hash logic 840 receives the hashes computed by the hash logic 810. Each of the 8 hash values received is checked for a match in the hash tables of hash table memory 850. When a match is found, the read hash logic 840 indicates that to Encoder logic 860, indicating the number of bytes matched. The minimum match length needs to be 3 bytes. As illustrated in FIG. 12, at most three non-overlapping matches can be found in a single clock cycle in the 8 bytes that were hashed by the hash logic 810, including a match with the last two bytes of the previous clock cycle. The read hash logic 840 can indicate all three matches to the encoder logic 860.

The above description has been written with a window size of 8 bytes of data for hashing and encoding. The window size is illustrative and by way of example only, and other window sizes can be used. In one embodiment, the compression engine 800 can vary the window size to vary the compression ratio responsive to the congestion level of the network 300. In such an embodiment, the hash logic 810, the write hash table logic 830, the read hash table logic 840, and the encoder 860 can be configured to select a window size of less than 8 bytes for hashing the data stream and reading and writing the hash tables 850. Where the window size is less than the full 8 bytes, the write hash table logic 830 inserts fewer than 8 hash table entries and the read hash table logic 840 reads fewer than 8 hash table entries from the hash tables 850.

In an embodiment such as the embodiment of FIG. 8, with no history buffer 900, the match is done with hashes and the corresponding input data. In an embodiment such as the embodiment of FIG. 9, where a history buffer 900 is available, the match is identified by the read hash logic 840 and data matching but the length of the match is determined by reading data from the history buffer 900.

In one embodiment, the network switch 100 can select whether to use the history buffer 900 depending on an indication received by the core logic 120 of congestion of the network 300, enabling use of the history buffer 900 at higher congestion levels, and disabling the history buffer 900 at lower congestion levels. In a further embodiment, the compression engine 800 can adaptively select how much of the available history buffer 900 to use, based on the congestion level. By varying the effective size of the history buffer, the compression engine 800 can vary the compression ratio of the data stream. A larger effective size of the history buffer 900 allows an increased potential for compressing of the data stream. In such an embodiment, if the effective size of the history buffer 900 is decreased, then hash table entries in the hash tables 850 that point to locations no longer in the effective size of the history buffer are marked as invalid.

The Encoder logic 860 is responsible for the insertion of literal and match code words into the output data stream, replacing the compressed input data when inserting the match code words. The encoder logic 860 writes the uncompressed data received from the write hash table logic 830 8 bytes at a time into a 4 KB private RAM 865 with a gap for a literal code word at the beginning. Once the first match is found, the length of the uncompressed string is written into a Literal code word in that gap. Once a match indication is received from the Read Hash Table logic 840, the encoder logic 860 stops writing the data received from the Write Hash Table logic until the {dist, length} vector is specified from the Read Hash Table logic 840. Then the encoder logic 860 updates the match code into the private RAM 865. The encoder logic also rotates and adjusts the input data to fit correctly after any of the match code words if the match length is not a multiple of 8 bytes.

In one embodiment, the encoder logic 860 can selectively enable or disable an entropy encoding technique, such as Huffman encoding, selectively increasing or decreasing, respectively, compression of the output data stream, including the code words described above, responsive to the network congestion level.

The FIFO logic 870 orients the data back into a 64-byte buffer and in one embodiment is implemented as a multi-byte input and 8-byte output FIFO. The FIFO buffer used by the FIFO logic 870 has a depth of 16 bytes. The FIFO logic 870 waits for 8 bytes to accumulate, then drives the data into the RAM logic 880.

The RAM logic 880 stores the output data until the first match is received. Once the first match is received and the match code is updated, data is ready to be sent out. If no match is found, then the RAM logic sends out the data when 4 KB of data (the maximum length of a segment) or EOP is received.

For example, if the network switch 100 is notified by a QCN congestion message that network congestion has decreased, the compression engine 800 can restrict the window size to 2 bytes, resulting in a lower level of compression. Similarly, if the network switch 100 is notified by a QCN congestion message that network congestion has increased, the compression engine 800 can increase the window size from 2 to a larger window size, depending on the amount of increase of congestion, to attempt to achieve a higher level of compression.

Turning back to FIG. 3, we now consider the decompression by the network switch 310 of the data compressed by the network switch 100. As with the compression, the decompression should be done at line rate in hardware. Preferably, the decompression should be implemented in a pipelined fashion and the latency of the logic should be kept at a minimum. Preferably, the decompression logic is capable of a 40 Gb rate, but 10 Gb rate can be acceptable in some embodiments. In one embodiment, the decompression logic supports a bypass mode in which the input data can be passed directly to output with no or minimal latency when the input data is not compressed. If the compression technique used by the network switch 100 included a CRC data, then the CRC added by compression should be stripped off. If a CRC error is found, then the decompression logic should indicate the same.

Figure 15:
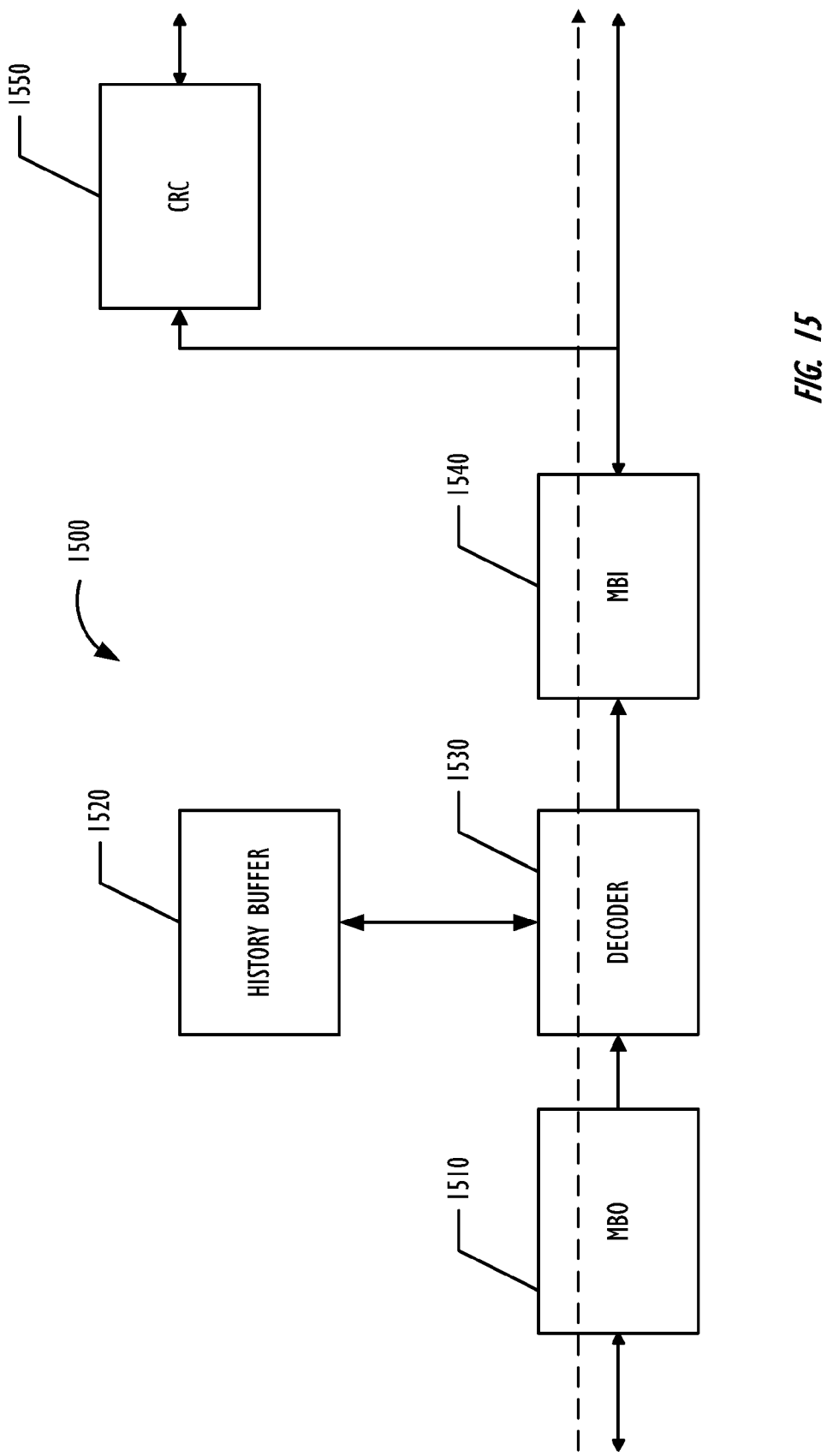
FIG. 15 is a block diagram illustrating logic blocks of a decompression engine logic according to one embodiment.

In one embodiment, a decompression logic 1500 is illustrated in FIG. 15. A multi-byte output block (MBO) 1510 receives 8 bytes of input data across a 64-bit data interface into a FIFO buffer. The output from the MBO 1510 is an 8-byte wide output interface, with a signal indicating how many of the 8 bytes are valid. The MBO 1510 aligns the input data to an 8-byte boundary based on the different byte reads requested.

A history buffer 1520 allows for processing the match codes in the data stream. In one embodiment, the history buffer 1520 has a capacity of 4 KB, which matches the maximum block size in compression encoder. The data width of the buffer 1520 is 64 bits with a buffer depth of 512 entries.

A Multi Byte Input FIFO (MBI) 1540 buffers output from the decompression logic 1500. The MBI 1540 provides 1 to 8 bytes of data with a signal indicating the number of valid bytes. Whenever there is 8 bytes of data available, the MBI sends it out on its output interface. If less than 8 bytes are available and the data is EOP, then the data is sent out with an EOP signal and the number of bytes specified. The MBI can accept data input with various byte widths and aligns them into 8-byte boundary.

The decoder 1530 is the main decompression engine of the decompression logic 1500. The decoder 1530 is responsible for stripping of literal and match code words. After stripping a literal code word, the following data is written to the MBI 1540 and into the history buffer 1520. The decoder in one embodiment is implemented as a state machine, as described in more detail below. Based on the literal code, the state machine of the decoder 1530 first reads only data bytes from the MBO 1510 and writes them into the history buffer 1520 and the MBI 1540. After that, it pre-fetches the match code and reads the whole match code. Based on the match code, data is read from the history buffer 1520 and written back in the new location of the history buffer 1520 and to the MBI 1540. After all the data for a code word is process, the decoder reads the next match or literal code word and repeats the above steps until an EOP indication is received. On EOP, the last set of data bytes are written into MBI 1540 and indicated as an EOP. The Start of Segment and End of Segment code words 500 and 510 are only for decoder's internal consumption. The End of Segment code word 510 should be used to indicate EOP if the current section is the last section of the packet.

The decompression logic 1500 does not need to adapt to the level of McLZO compression performed by the compression logic 800. In some embodiments, where an entropy encoding such as Huffman encoding is used for additional compression at some congestion levels, the decompression logic 1500 can detect the presence of entropy encoding and decode the entropy encoded data stream prior to decompressing the McLZO-compressed data. In embodiments were a calculated entropy encoding library is used, the decompression logic 1500 can recognize the calculated library that is sent from the compression engine 800 of the network switch 100 and use that calculated library for decoding. A bypass mode can be provided that bypasses decompression when the input data stream is not compressed.

The CRC logic 1550 calculates the CRC over the 64-bit data received from the MBI 1540 and indicates with an error signal if the CRC/Parity does not match.

Figure 16:
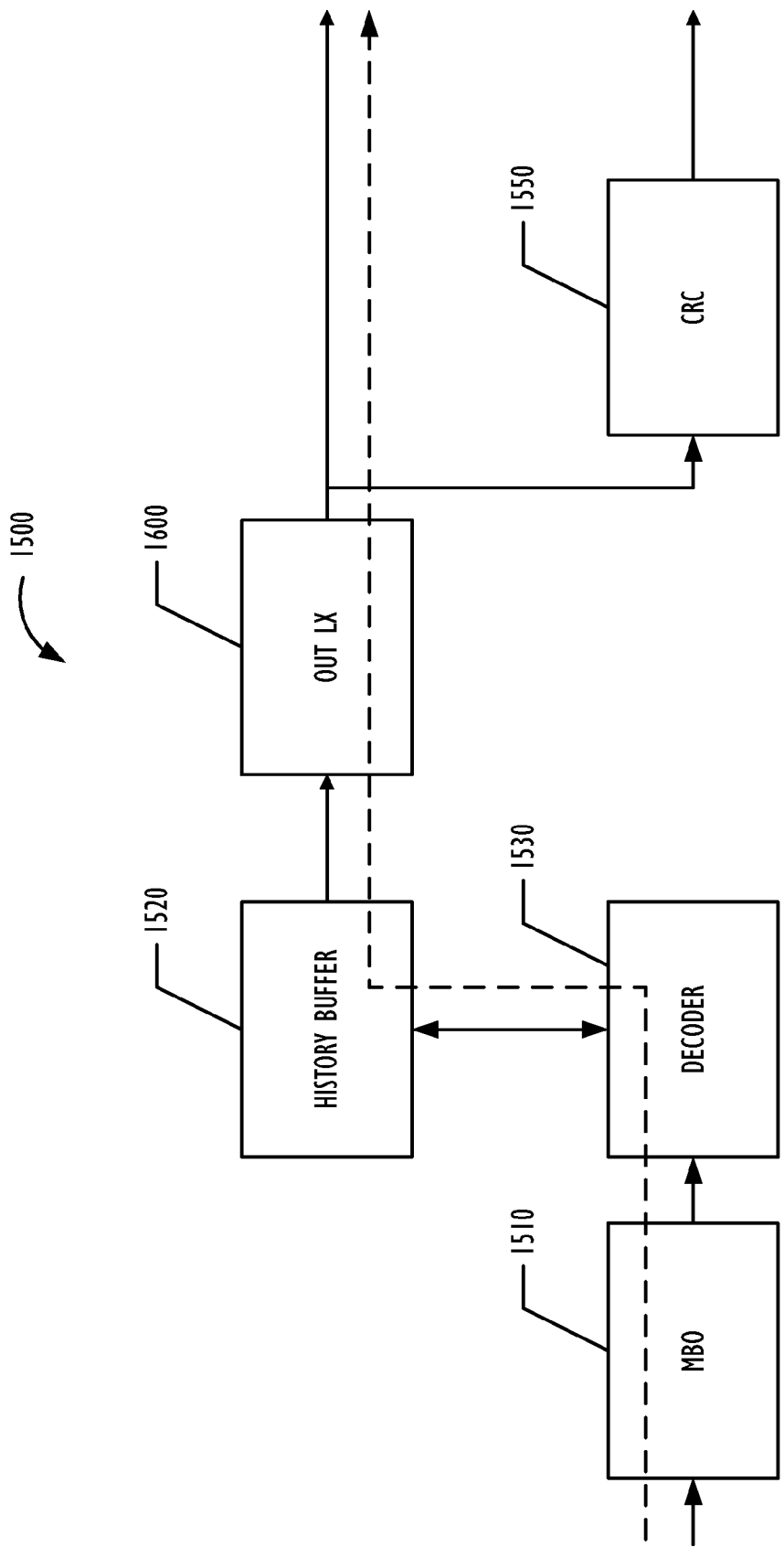
FIG. 16 is a block diagram illustrating logic blocks of a decompression engine logic according to another embodiment.

In another embodiment, illustrated in FIG. 16, instead of the decoder 1530 writing data to the MBI 1540, an output block 1600 pulls the output data from the history buffer 1520.

In both FIGS. 15 and 16, the dashed line indicates the data path when no match code words are found in the input data stream.

Figure 17:
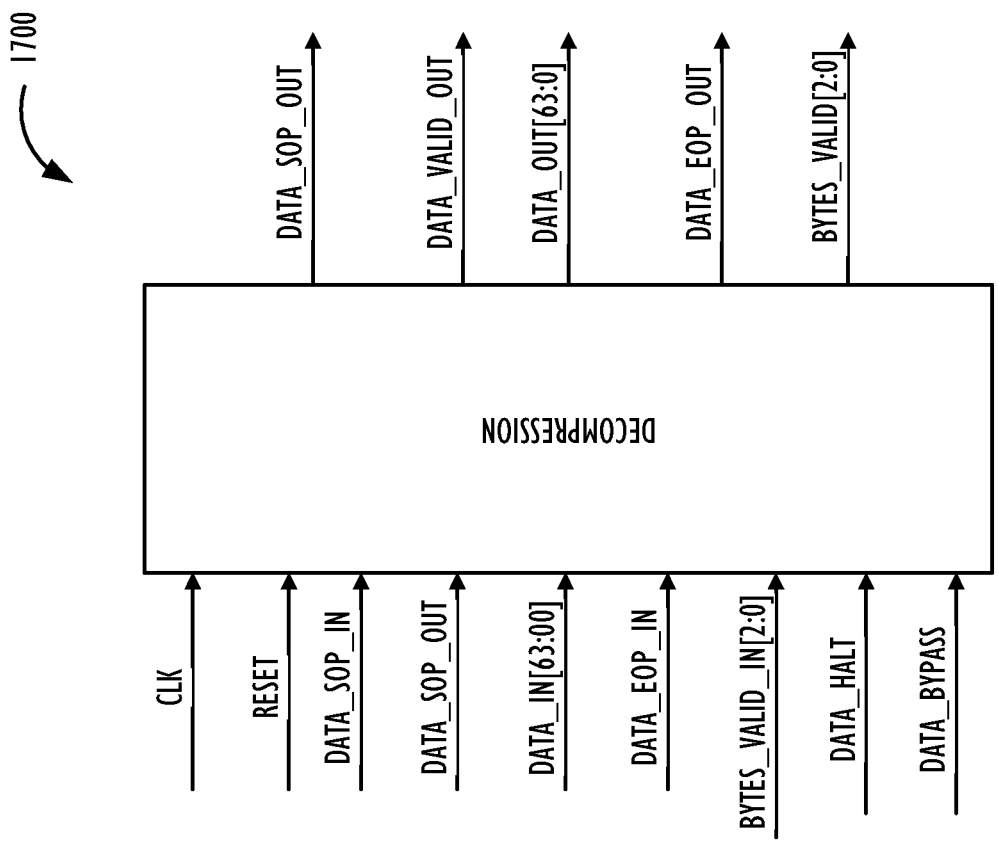
FIG. 17 is a block diagram illustrating a decompression logic according to the embodiments of FIGS. 15 and 16.

FIG. 17 is a higher-level view of the decompression logic 1500 as a single logic block 1700. The data_in line provides 8-byte wide input data to the decompression logic block 1700, which decompresses the data and outputs the decompressed data on the data_out line. A bytes_valid_in line indicates how many of the 8 input bytes are valid, and a bytes_valid line indicates how many of the 8 output bytes are valid. Other lines provide other useful signals to and from the decompression logic block 1700, including EOP.

Figure 18:
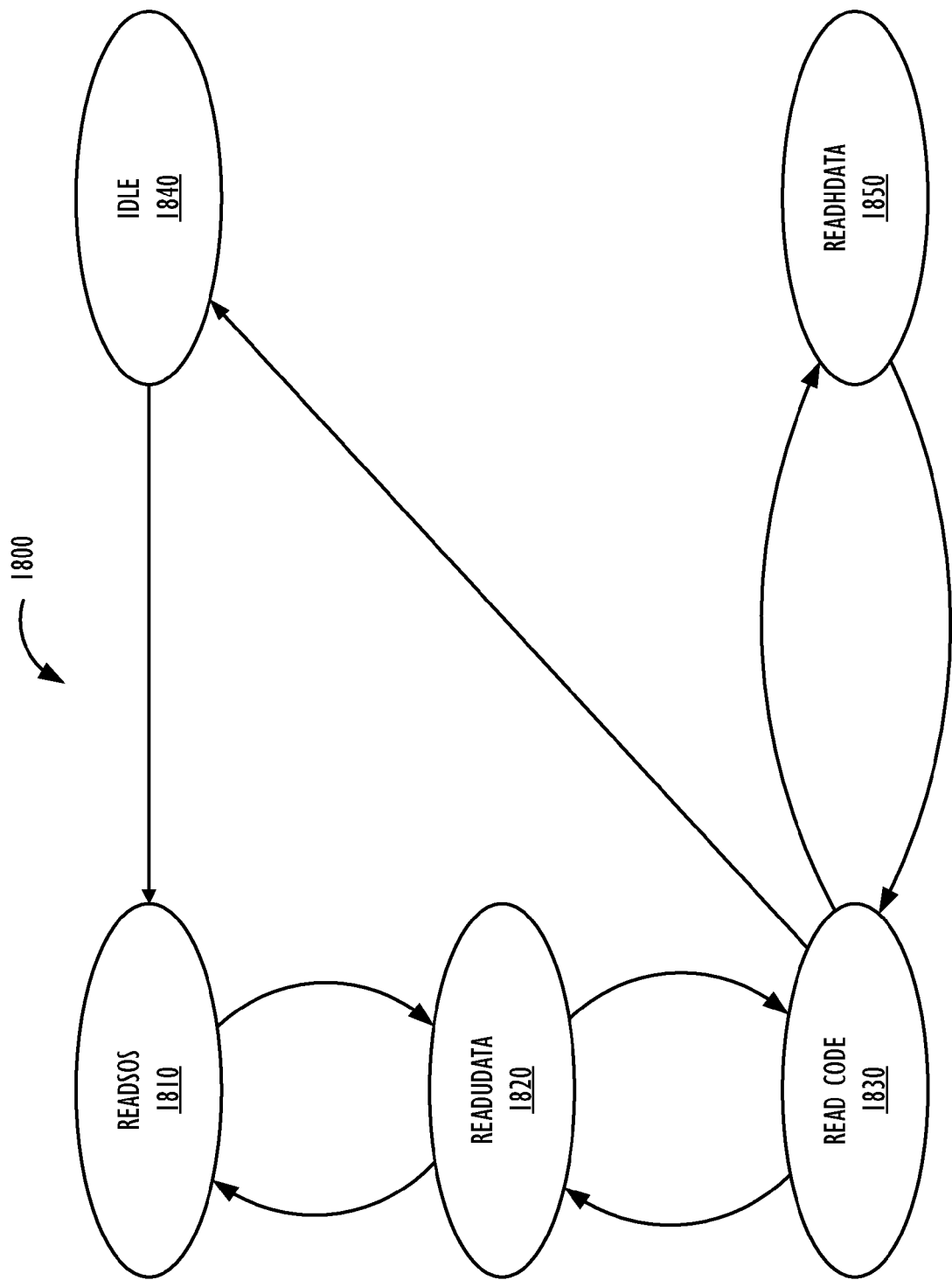
FIG. 18 is a state diagram for a state machine for decompression according to the embodiments of FIGS. 15 and 16.

FIG. 18 illustrates a state machine 1800 for the decoder 1520 according to one embodiment.

The state machine 1800 begins in the IDLE state 1840. In this state, the state machine waits for the MBO 1510 to de-assert the empty signal. Once the empty signal is de-asserted, the state machine moves to ReadSOS state 1810.

In the ReadSOS state 1810, the decoder reads and analyzes a Start of Segment code. Based on the Start of Segment code, the length of the uncompressed data to be read is determined. The state machine 1800 then transits to the ReadUData state 1820.

In the ReadUData state 1820, the uncompressed data is read from the MBO 1510 and written to the MBI 1540 and the History buffer 1530 simultaneously, if in the embodiment of FIG. 15; or just to the History buffer 1530, if in the embodiment of FIG. 16. Based on the number of bytes read, the read data counter is decremented. Once, the data count reaches zero, the state changes to the ReadCode state 1830.

The ReadCode state 1830 reads the next code from the MBO 1510. The code can be a match, literal, or End of Segment code word. If the code is a literal code, the state changes to the ReadUData 1820. If the code is a match code, then the state changes to the ReadHData stage 1850; if an end of segment code, the decoder 1530 moves to the IDLE state 1840. If the code is a match code, the distance and length counters are updated.

In the ReadHData state 1850, the address of the History buffer 1520 is calculated and data is read from History buffer 1520 and pushed to the MBI 1540. The counter for length is decremented while the data transfer is happening. The data is also written back into History buffer 1520 at the current location. Once the length counter reaches zero, the state changes to the ReadCode state 1830.

In conclusion, the described techniques allow a network switch 100 to compress an output data stream adaptively based on indications of network congestion. These indications can include simple pause notifications or more complex congestion notifications that indicate a quantized level of congestion, allowing finer control over the response of the network switch 100.

In embodiments where the indications are simple pause flow control messages, the compression can be enabled upon receipt of the pause message and disabled when the flow control mechanism allows data to begin to flow across the network.

In embodiments where multiple levels of compression can be indicated in congestion messages, when the congestion level increases, the congestion technique can be adapted to increase compression. When the congestion level decreases, the congestion technique can be adapted to decrease compression, or even disable compression altogether. The adaptive compression technique can thus achieve a lower end-to-end latency across the network.

At the receiving network switch, the decompression technique can generally decompress the compressed data stream at line speed.

While certain exemplary embodiments have been described in details and shown in the accompanying drawings, it is to be understood that such embodiments are merely illustrative of and not devised without departing from the basic scope thereof, which is determined by the claims that follow.

We claim:

1. A compression engine for a network device for producing a compressed data stream from a data stream, comprising:
    a matching logic, adapted to identify a matched string by detecting previous instances of a string in the data stream, configurable to adapt a single compression technique to vary a compression ratio responsive to a quantized level of network congestion; and
    an encoding logic, adapted to receive information about the matched string from the matching logic and to replace the matched string with a shorter string in the data stream, configurable to adapt a compression technique to vary the compression ratio responsive to the quantized level of network congestion,
    wherein the compression ratio varies generally proportionally to the quantized level of network congestion, and
    wherein the matching logic and the encoding logic repetitively compress data of the data stream for a number of repetitions, determined responsive to the quantized level of network congestion.

2. The compression engine of claim 1, wherein the matching logic comprises:
    a hashing logic, adapted to hash the string,
    wherein the string has a size that is configurable responsive to the quantized level of network congestion.

3. The compression engine of claim 1, wherein the matching logic comprises:
    a hash table memory, configurable responsive to the quantized level of network congestion.

4. The compression engine of claim 1, wherein the matching logic comprises:
    a hashing logic, adapted to hash the string, configurable to hash different size strings responsive to the quantized level of network congestion;
    a hash table memory, configurable responsive to the quantized level of network congestion;
    a hash write logic, adapted to store entries into the hash table memory responsive to the hashing logic; and
    a hash read logic, adapted to read hash table entries from the hash table memory responsive to the hashing logic and to provide matching information to the encoding logic.

5. The compression engine of claim 1, wherein the matching logic matches strings of a length that varies responsive to the quantized level of network congestion.

6. The compression engine of claim 1, wherein the matching logic comprises:
    a history buffer, configurable to allow use of a variable portion of the history butter responsive to the quantized level of network congestion.

7. The compression engine of claim 1, wherein the matching logic comprises:
    a hashing logic, adapted to hash the string;
    a hash table memory;
    a history buffer, configurable responsive to the quantized level of network congestion,
    a hash write logic, adapted to store entries into the hash table memory responsive to the hashing logic and to store the string into the history buffer; and
    a hash read logic, adapted to read hash table entries from the hash table memory responsive to the hashing logic, to read strings from the history buffer, and to provide matching information to the encoding logic.

8. The compression engine of claim 1, wherein the encoding logic is further adapted to perform an entropy encoding of the compressed data stream, responsive to the quantized level of network congestion.

9. The compression engine of claim 8, wherein the entropy encoding is Huffman encoding.

10. The compression engine of claim 1, wherein the compression engine produces a Liv-Zempel-Oberhumer compressed data stream.

11. A method of compressing a data stream in a network device, comprising:
receiving an indication of a quantized level of network congestion; and
configuring a compression engine to adapt a single compression technique to vary a compression ratio proportionally to the quantized level of network congestion, comprising:
identifying a matched string by detecting previous instances of a string in the data stream;
receiving information about the matched string and replacing the matched string with a shorter string in the data stream;
adapting the single compression technique to vary the compression ratio responsive to the quantized level of network congestion; and
repetitively compressing data in the data stream for a number of repetitions determined proportionally to the quantized level of network congestion.

12. The method of claim 11, wherein receiving an indication of a quantized level of network congestion comprises:
receiving a message indicating the quantized level of network congestion; and
providing the quantized level of network congestion to the compression engine.

13. The method of claim 11, wherein configuring the compression engine comprises:
enabling and disabling use of a history table for matching strings in the data stream responsive to the quantized level of network congestion.

14. The method of claim 11, wherein configuring the compression engine comprises:
configuring a variable portion of a history table as available for matching strings in the data stream responsive to the quantized level of network congestion.

15. The method of claim 11, wherein configuring the compression engine comprises:
hashing a plurality of strings in the data stream;
matching each of the plurality of strings against entries in a hash table responsive to hashing the plurality of strings; and
writing hash table entries responsive to hashing the plurality of strings,
wherein each of the plurality of strings has a length, the length configured proportionally to the quantized level of network congestion.

16. The method of claim 11, wherein configuring a compression engine comprises:
enabling or disabling an entropy encoding of the data stream responsive to the quantized level of network congestion.

17. The method of claim 11, wherein configuring a compression engine comprises:
configuring a variable portion of a hash table memory as available for storing hash table entries responsive to the quantized level of network congestion.

18. A network device, comprising:
a host interface logic;
a core logic coupled to the host interface logic, comprising:
a congestion recognition logic;
a compression engine, coupled to the congestion recognition logic configurable to adapt a single compression technique to vary a data compression ratio of a transmitted compressed data stream responsive to a quantized level of network congestion,
a media access control logic coupled to the core logic; and
a serializer-deserializer logic, coupled to the media access control logic,
wherein the compression ratio varies generally proportionally to the quantized level of network congestion, and
wherein the compression engine repetitively compresses data of the transmitted compressed data stream for a number of repetitions determined responsive to the quantized level of network congestion.

19. The network device of claim 18, wherein the compression engine comprises:
a matching logic, adapted to identify a matched string by detecting previous instances of a string in a data stream, configurable to adapt the compression technique to vary the data compression ratio responsive to the quantized level of network congestion; and
an encoding logic, adapted to receive information about the matched string from the matching logic and to replace the matched string with a shorter string in the data stream, configurable to adapt the compression technique to vary the data compression ratio responsive to the quantized level of network congestion.

20. The network device of claim 19, wherein the matching logic comprises:
a hashing logic, adapted to hash the string, configurable to hash different size strings responsive to the quantized level of network congestion.

21. The network device of claim 19, wherein the matching logic comprises:
a hash table memory, configurable responsive to the quantized level of network congestion.

22. The network device of claim 19, wherein the matching logic matches strings of a length that is responsive to the quantized level of network congestion.

23. The network device of claim 19, wherein the matching logic comprises:
a history buffer, configurable to allow use of a variable portion of the history buffer responsive to the quantized level of network congestion.

24. The network device of claim 19, wherein the matching logic comprises:
a hashing logic, adapted to hash the string;
a hash table memory;
a history buffer wherein a usable area of the history buffer is configurable responsive to the quantized level of network congestion,
a hash write logic, adapted to store entries into the hash table memory responsive to the hashing logic and to store the string into the history buffer; and
a hash read logic, adapted to read hash table entries from the hash table memory responsive to the hashing logic, to read strings from the history buffer, and to provide matching information to the encoding logic.

25. The network device of claim 19, wherein the encoding logic is further adapted to perform an entropy encoding of the compressed data stream, responsive to the quantized level of network congestion.

26. The network device of claim 25, wherein the entropy encoding is Huffman encoding.

27. The network device of claim 18, wherein the compression engine comprises:
a hashing logic, adapted to hash a string in a data stream, configurable to hash different size strings responsive to the quantized level of network congestion;

a hash table memory, configurable responsive to the quantized level of network congestion;

a hash write logic, adapted to store entries into the hash table memory responsive to the hashing logic;

a hash read logic, adapted to read hash table entries from the hash table memory responsive to the hashing logic; and an encoding logic, adapted to receive matching information from the hash read logic, and adapted to replace a matched string with a shorter string in the data stream, configurable to vary the data compression ratio responsive to the quantized level of network congestion.

28. The network device of claim 18, where the compression engine performs a Liv-Zempel-Oberhumer compression on a data stream to generate the compressed data stream.

29. The network device of claim 18, wherein the core logic further comprises:

a decompression engine, adapted to decompress a compressed data stream.

30. The network device of claim 18, wherein the compression engine enables and disables compression responsive to the quantized level of network congestion.

31. A network device, comprising:

a compression engine, adapted to adapt a single compression technique to vary compression of a received data stream into a compressed data stream proportionally to a quantized level of network congestion, comprising:

a matching logic, adapted to identify a matched string by detecting previous instances of a string in the data stream; and an encoding logic, adapted to replace the matched string with a shorter string in the data stream, wherein the matching logic and the encoding logic are configurable to adapt the compression technique to vary a compression ratio of the matched string and the shorter string responsive to the quantized level of network congestion, and wherein the compression engine repetitively compresses data in the data stream for a number of repetitions determined proportionally to the quantized level of network congestion.

32. The network device of claim 31, wherein the matching logic comprises:

a hashing logic, adapted to hash the string, wherein the string has a size that is configurable responsive to the quantized level of network congestion.

33. The network device of claim 31, wherein the matching logic comprises:

a hash table memory, configurable responsive to the quantized level of network congestion.

34. The network device of claim 31, wherein the matching logic comprises:

a hashing logic, adapted to hash the string, configurable to hash different size strings responsive to the quantized level of network congestion;

a hash table memory, configurable responsive to the quantized level of network congestion;

a hash write logic, adapted to store entries into the hash table memory responsive to the hashing logic; and a hash read logic, adapted to read hash table entries from the hash table memory responsive to the hashing logic and to provide matching information to the encoding logic.

35. The network device of claim 31, wherein the matching logic comprises:

a history buffer, configurable to allow use of a variable portion of the history buffer responsive to the quantized level of network congestion.

36. The network device of claim 31, wherein the encoding logic is further adapted to perform an entropy encoding of the compressed data stream, responsive to the quantized level of network congestion.

* * * * *